(12) United States Patent
Jang et al.

(10) Patent No.: US 8,009,067 B2
(45) Date of Patent: *Aug. 30, 2011

(54) METHOD AND APPARATUS FOR CODING AND DECODING USING BIT-PRECISION

(75) Inventors: Euee-Seon Jang, Seoul (KR);
Sun-Young Lee, Seoul (KR); Gi-Seok Son, Seoul (KR); Chung-Ku Lee, Incheon (KR)

(73) Assignee: Humax, Co., Ltd., Seongnam-Si, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/694,248

(22) Filed: Jan. 26, 2010

(65) Prior Publication Data
US 2010/0127903 A1   May 27, 2010

Related U.S. Application Data

(63) Continuation of application No. 12/669,770, filed as application No. PCT/KR2008/004232 on Jul. 18, 2008.

(30) Foreign Application Priority Data

| | | |
|---|---|---|
| Jul. 18, 2007 | (KR) | 10-2007-0071779 |
| Feb. 20, 2008 | (KR) | 10-2008-0015213 |
| Mar. 17, 2008 | (KR) | 10-2008-0024643 |
| Apr. 23, 2008 | (KR) | 10-2008-0037856 |

(51) Int. Cl.
*H03M 7/38* (2006.01)
(52) U.S. Cl. .......... 341/51; 375/260
(58) Field of Classification Search ......... 341/50–80; 375/240, 295, 316, 260, 210, 240.12, E7.243, 375/E7.246
See application file for complete search history.

(56) References Cited

U.S. PATENT DOCUMENTS

| | | | |
|---|---|---|---|
| 5,963,673 | A | 10/1999 | Kodama et al. |
| 6,137,839 | A * | 10/2000 | Mannering et al. ......... 375/260 |
| 6,950,466 | B2 | 9/2005 | Kim et al. |
| 2006/0291565 | A1 | 12/2006 | Chen |

* cited by examiner

*Primary Examiner* — Lam T Mai
(74) *Attorney, Agent, or Firm* — Birch, Stewart, Kolash & Birch, LLP

(57) ABSTRACT

Discussed are a method and an apparatus of encoding/decoding by using a bit precision. In accordance to an aspect of the present invention, it is possible to encoding and decoding an image or a video by using a bit precision. Accordingly, compression efficiency can be improved and the decoding complexity can be reduced by encoding/decoding video data by use of the bit precision.

14 Claims, 16 Drawing Sheets

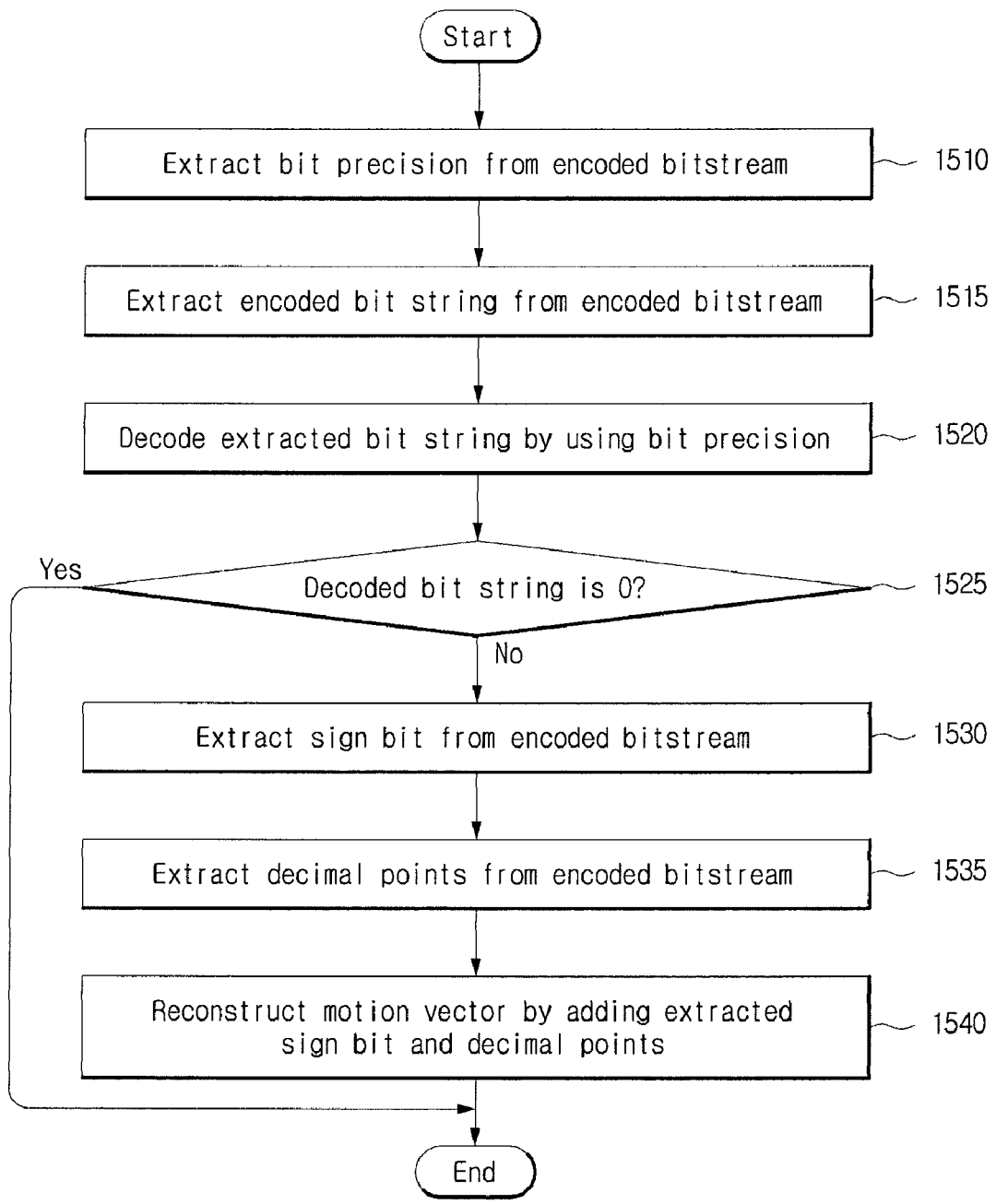

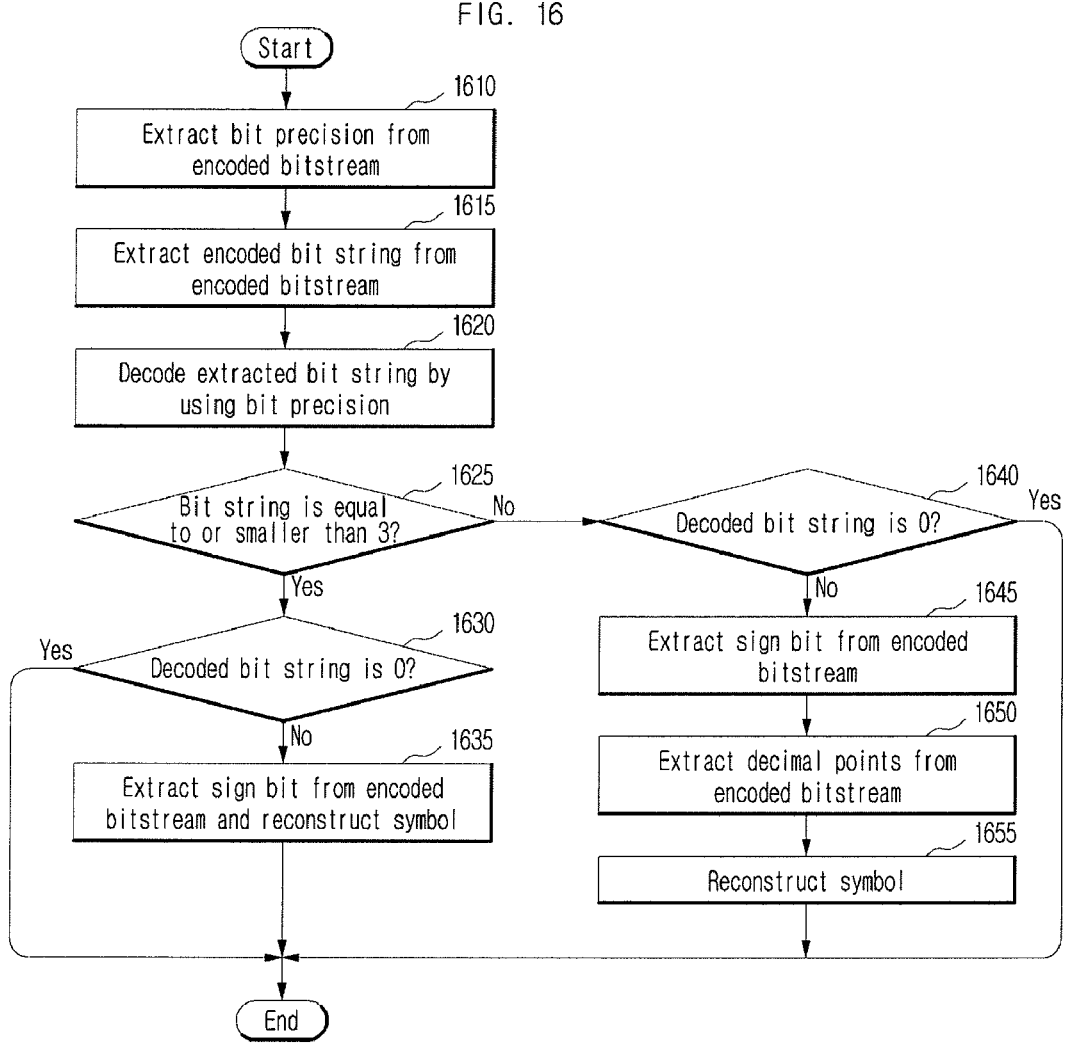

METHOD AND APPARATUS FOR CODING AND DECODING USING BIT-PRECISION

This application is a Continuation of co-pending U.S. application Ser. No. 12/669,770 filed on Jan. 19, 2010, which is a National Phase of PCT/KR2008/004232 filed on Jul. 18, 2008, which claims priority under 35 U.S.C. 119(a) to Korean Patent Application No. 10-2007-0071779, 10-2008-0024643, 10-2008-0037856, and 10-2008-0015213 filed in Korea on Jul. 18, 2007, Mar. 17, 2008, Apr. 23, 2008 and Feb. 20, 2008, respectively. Each of these applications are hereby expressly incorporated by reference into the present application.

TECHNICAL FIELD

The present invention relates to an apparatus for coding and decoding (hereinafter, referred to as coding/decoding), more specifically to a coding/decoding method and apparatus for improving compression efficiency of video data.

BACKGROUND ART

With the increase of data transmission capacity per second through the Internet, there has been an increased amount of multimedia data, including video and picture files, over the past, when simple text data had been mostly transmitted. Accordingly, there has been an increased demand for video compression technologies.

A video is compressed by undergoing an entropy coding, which transforms a bit string indicating a symbol of data to another form. The entropy coding is classified into a Huffman coding and an arithmetic coding. In particular, the Huffman coding is popularly used in many video compression codecs because of its efficient compression and proper decoding complexity. In spite of having high decoding complexity, the arithmetic coding has relatively high compression efficiency. Accordingly, the arithmetic coding is used in the fields which require the high compression efficiency.

The recent advent of low-performance mobile media apparatuses, which runs in limited power, requires an entropy coding method that has less complex decoding. Nevertheless, there have been far less studies on how to make the decoding less complex than how to improve the video compression efficiency.

An entropy coding method using a bit precision has been recently suggested to lower the decoding complexity. However, the entropy coding method has low compression efficiency because of additionally inserting one bit precision into a bitstream per VOP or macroblock.

DISCLOSURE

Technical Problem

Accordingly, the present invention provides a coding/decoding method and apparatus using a bit precision that can improve compression efficiency by selecting an adequate predictor without a generated additional bit.

The present invention also provides a coding/decoding method and apparatus using a bit precision that can lower a decoding complexity and shorten a decoding time by using the bit precision.

The present invention provides a coding/decoding method and apparatus using a bit precision that can encode/decode video data by using an prediction bit precision computed based on an adjacent macroblock, to thereby improve compression efficiency.

The present invention provides a coding/decoding method and apparatus using a bit precision that can encode/decode video data by using a bit precision corresponding to symbols of an adjacent macroblock, to thereby improve compression efficiency and lower decoding complexity.

The present invention provides a coding/decoding method and apparatus using a bit precision that can encode/decode video data by using a bit precision selected by a plurality of methods, to thereby improve compression efficiency.

In addition, the present invention provides a coding/decoding method and apparatus using a bit precision that can encode/decode video data by differently computing a bit precision per each field, to thereby improve compression efficiency.

Technical Solution

An aspect of the present invention features an apparatus capable of encoding video data by using a bit precision.

In accordance with an embodiment of the present invention, an encoding apparatus can include an adaptive bit precision computing unit, configured to compute an adaptive bit precision and an adaptive bit string per symbol; a bit precision computing unit, configured to compute a bit precision per predetermined field; and an encoding unit, configured to encode an input datum by using any one of the adaptive bit precision and the bit precision according to a type of a target field.

Another aspect of the present invention features an apparatus capable of decoding video data by using a bit precision.

In accordance with an embodiment of the present invention, an encoding apparatus can include an adaptive bit precision computing unit, configured to compute an adaptive bit precision and an adaptive bit string of a symbol; and an encoding unit, configured to compute a bit precision per field and to insert the adaptive bit string and any one of the bit precision and the adaptive bit precision, according to whether the bit precision is identical to the adaptive bit precision, into a bitstream. Here, the encoding unit can further insert a bit indicating whether the adaptive bit precision is identical to the adaptive bit string into the bitstream.

Advantageous Effects

The present invention can select an adequate predictor without a generated additional bit to improve compression efficiency by providing a coding/decoding method and device using a bit precision The present invention can also lower a decoding complexity and shorten a decoding time by using the bit precision.

The present invention can encode/decode video data by using a prediction bit precision computed based on an adjacent macroblock, to thereby improve compression efficiency.

The present invention can encode/decode video data by using a bit precision corresponding to symbols of an adjacent macroblock, to thereby improve compression efficiency and lower decoding complexity.

The present invention can encode/decode video data by using a bit precision selected by a plurality of methods, to thereby improve compression efficiency.

In addition, the present invention can encode/decode video data by differently computing a bit precision per each field, to thereby improve compression efficiency.

DESCRIPTION OF DRAWINGS

FIG. 15 is a flow chart showing an operation of decoding an encoded bitstream by using bit precision in accordance with another embodiment of the present invention; and FIG. 16 is a flow chart showing an operation of decoding an encoded bitstream as a symbol by using bit precision in accordance with another embodiment of the present invention.

MODE FOR INVENTION

Figure 1:
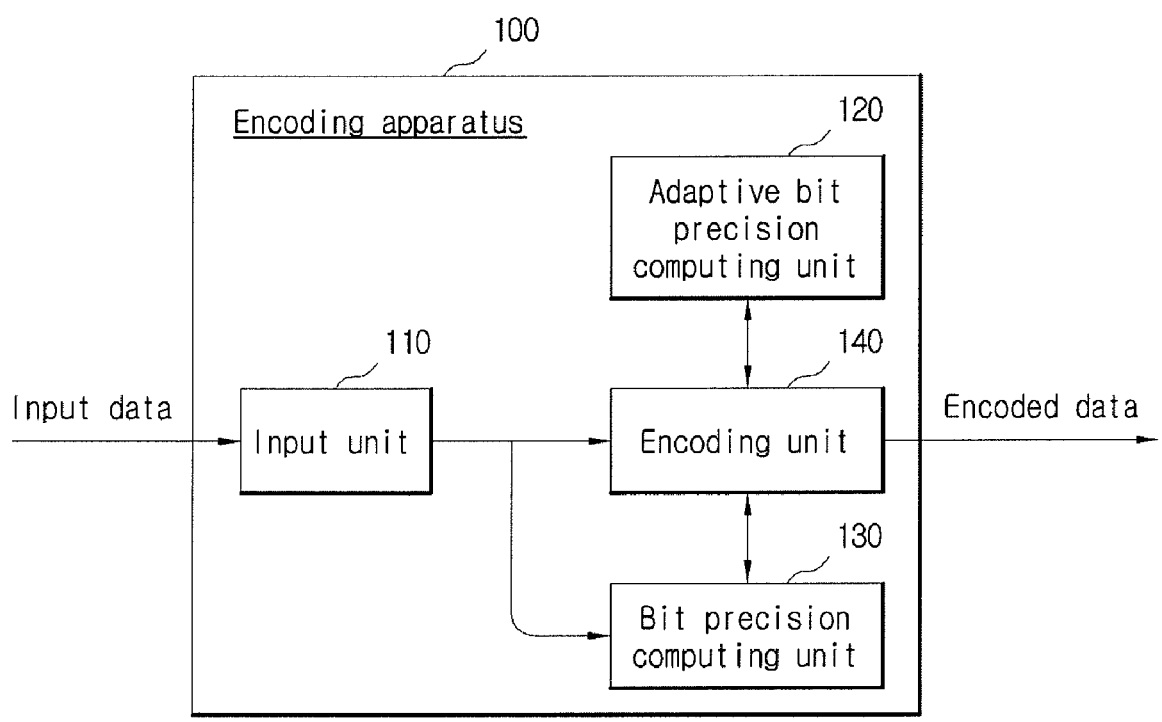
FIG. 1 is a block diagram showing an encoding apparatus using a bit precision in accordance with an embodiment of the present invention.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Hereinafter, some embodiments of the present invention will be described in detail with reference to the accompanying drawings.

For the convenience of understanding and description, the conception of the encoding method using a bit-precision in accordance with an embodiment of the present invention will be firstly described as follows.

The encoding method in accordance with an embodiment of the present invention determines a bit precision for each symbol of input data. Here, the symbol refers to a word unit, which forms the input data. The bit precision indicates a length of a unit bitstream for encoding each symbol by using a bit or a binary code. For example, if the bit precision is n, an inputted symbol is represented and encoded in the binary code by using the unit bitstreams in the quantities of n.

It is assumed that the inputted symbols are {2, 1, 0, 4, 5 3} and the bit-precision value is 2. Values 0 through 3 can be represented by using two bits. If the symbol value is larger than 3, it is impossible to represent the symbol value by using 2 bits. Accordingly, the symbol value that is larger than 3 is represented by additionally assigning two bits.

In particular, the symbol values "2", "1", and '0' are binarized as "10," "01" and "00." However, since the symbol value "4" is larger than "3" that is the maximum value capable of being represented by using 2 bits, it is impossible that the symbol value "4" is represented by using 2 bits only.

Accordingly, the symbol value "4" is represented by allowing the "3" that is the maximum value capable of being represented by using 2 bits to be represented as "11" and the remainder, "1." to be represented as "01" by using another 2 bits. As a result, the symbol "4" is represented as "1101" by adding another 2 bits to the first 2 bits. Similarly, the symbol value "5" is represented as "1110" by using the maximum value "3" with 2 bits and the remainder "2" with another 2 bits. Even though it is possible that the symbol value "3" is represented by the 2 bits only, the symbol value "3" is represented by additionally using another 2 bits for the remainder "0" as "1100" in order to distinguish what is represented for 3 and more from what is represented for 3.

If the aforementioned coding method using a bit-precision is applied to the symbol values of data of 0 through 9, the symbol values can be represented as shown in the following table 1.

TABLE 1

| | Bit-precision Value 1 Bit | Bit-precision Value 2 Bit | Bit-precision Value 3 Bit | Bit-precision Value 4 Bit | Bit-precision Value 5 Bit |
|---|---|---|---|---|---|
| 0 | 0 | 00 | 000 | 0000 | 00000 |
| 1 | 01 | 01 | 001 | 0001 | 00001 |
| 2 | 001 | 10 | 010 | 0010 | 00010 |
| 3 | 0001 | 1100 | 011 | 0011 | 00011 |
| 4 | 00001 | 1101 | 100 | 0100 | 00100 |
| 5 | 000001 | 1110 | 101 | 0101 | 00101 |
| 6 | 0000001 | 111100 | 110 | 0110 | 00110 |
| 7 | 00000001 | 111101 | 111000 | 0111 | 00111 |
| 8 | 000000001 | 111110 | 111001 | 1000 | 01000 |
| 9 | 0000000001 | 11111100 | 111010 | 1001 | 01001 |

As shown in the table 1, encoding strings of symbols corresponding to bit precision values are different from each other. Accordingly, it is required to determine which bit precision of various types of bit precisions is used to encode input data before the encoding operation is performed. An encoding compression rate of the input data is also varied depending on the determined bit precision. The symbols to be encoded are encoded by using all bit precisions. Then, the bit precision having the best compression rate is finally selected for the bit precision to be encoded.

For example, if it is assumed that the encoding is performed by using the bit precision values, 1 through 3, all symbols of a certain macroblock is encoded by using the bit precision values, 1 through 3. At this time, if the macroblocks encoded by using the bit precisions, 1, 2 and 3 have the capacities of 3, 2 and 1 Mbyte, respectively, the bit precision 3 is finally selected as the bit precision of the pertinent macroblock.

In accordance with an embodiment of the present invention, an additional bit precision (hereinafter, referred to as an "adaptive bit precision") can be computed corresponding to each symbol in addition to the bit precision. Here, the adaptive bit precision refers to the length of a unit bit string for encoding each symbol. Hereinafter, the adaptive bit precision will be briefly described for the convenience of understanding and description.

Each symbol can be represented in the adaptive bit precision and an adaptive bit string before being inserted into the bitstream. The below table 2 shows the adaptive bit precision and the adaptive bit string of each symbol.

TABLE 2

| Symbol | Adaptive bit precision | Adaptive bit string |
|---|---|---|
| 0 | 0 | — |
| 1 | 1 | — |
| 2 | 2 | — |
| 3 | 3 | 00 |
| 4 | 3 | 01 |
| 5 | 3 | 10 |
| 6 | 3 | 11 |
| 7 | 4 | 000 |
| 8 | 4 | 001 |

The length of each adaptive bit string is determined as a value obtained by subtracting "1" from the adaptive bit precision. For example, if the adaptive bit precision is "3," the length of the pertinent adaptive bit string as "2" (i.e. 2 bits). At this time, if the adaptive bit precision has the values of 0 through 2, the symbol is represented in the adaptive bit precision only without the adaptive bit string. Since the length of each adaptive bit string is a value obtained by subtracting "1" from the adaptive bit precision, the adaptive bit strings can represent the symbols in the quantities of the $n^{th}$ power of 2. Here, n is obtained by subtracting "1" from the adaptive bit precision. For example, the adaptive bit precision, 3, can represent 4 symbols, and the adaptive bit precision, 4, can represent 8 symbols. In the case of the adaptive bit precision, 3, as shown in the table 2, "00," "01," "10" and "11" correspond to 3, 4, 5 and 6, respectively. In the case of the adaptive bit precision, 4, "000," "001," "010," "011," "100," "101," "110" and "111" correspond to 7, 8, 9, 10, 11, 12, 13 and 14, respectively. The aforementioned adaptive bit precision and adaptive bit string are inserted to a bitstream before being transmitted to a decoder. At this time, the adaptive bit precision can be inserted to the bitstream by undergoing an additional process. This will be described in detail below with reference to the related drawings.

FIG. 1 is a block diagram showing an encoding apparatus using a bit precision in accordance with an embodiment of the present invention.

Referring to FIG. 1, the encoding apparatus 100 using a bit precision in accordance with an embodiment of the present invention includes an input unit 110, an adaptive bit precision computing unit 120, a bit precision extracting unit 130 and an encoding unit 140.

The input unit 110 receives input data from the outside and extracts and outputs symbols to be encoded. At this time, the input unit 110 can output the extracted symbols along with distinguishment information that distinguishes the symbols in units of VOP and macroblock (i.e. block having a predetermined size. The input unit 110 also extracts field information from the input data to output the extracted field information. Here, the field information indicates the kind (i.e. type) of fields of the input data. As a result, the input unit 110 outputs the field information, the distinguishment information and the symbol to the bit precision extracting unit 130 and the encoding unit 140.

At this time, the input data can include at least one of a macroblock type & coded block pattern for chrominance (mcbpc) field, a coded block pattern for luminance (cbpy) field, motion vector (mv-x and mv-y) fields and DCT (DCT-luma and DCT-chroma) fields. The mcbpc, cbpy, motion vector and DCT fields are used in the encoding/decoding operation according to the MPEG standard. Since this is evident to any person of ordinary skill in the art, the pertinent detailed description will be omitted.

In this description, the encoding/decoding operation according to the MPEG-4 standard will be described. Accordingly, the fields of the input data will be described based on the mcbpc, cbpy, the motion vector and DCT fields. However, if the encoding/decoding targets are different fields such as AVC and RV9, although the names of the fields of the input data are different, this can be applied to the present invention.

The adaptive bit precision computing unit 120 computes an adaptive bit precision and an adaptive bit string of a certain block according to a requesting signal of the encoding unit 140 and outputs them to the encoding unit 140. Since the method of the adaptive bit precision and the adaptive bit string has been described by using the table 2, the pertinent detailed description will be omitted.

Of course, if the adaptive bit precision and the adaptive bit string of the certain block are stored in the adaptive bit precision computing unit 120, the additional computing operation can be omitted. For example, in case that the adaptive bit precision and the adaptive bit string of the certain block are pre-stored in the adaptive bit precision computing unit 120, if a signal requesting the adaptive bit precision and the adaptive bit string of the certain block is inputted, the adaptive bit precision computing unit 120 can extracts the adaptive bit precision and the adaptive bit string of the certain block pre-stored corresponding to the pertinent symbol and outputs them to encoding unit 140.

Moreover, an adaptive bit precision and an adaptive bit string corresponding to each symbol can be pre-stored in the encoding unit 140 according to the embodying method of the encoding unit. In this case, the adaptive bit precision computing unit 120 can be omitted in the encoding unit 100.

The bit precision computing unit 130 distinguishes the inputted symbols in units of VOP (or macroblock) and computes the bit precision to output it to the encoding unit. The detailed operation of the bit precision is the same as described above.

The encoding unit 140 encodes the symbols by using the adaptive bit precision and the bit precision inputted from the adaptive bit precision computing unit 120 and/or the bit precision computing unit 130. The encoding unit 140 also differently each symbol according to the field information inputted through the input unit 110. In other words, the encoding unit 140 can select one of a plurality of decoding operations according to the inputted field information and decodes the symbols. This will be described below in detail with reference to FIG. 2 through FIG. 6.

Figure 2:
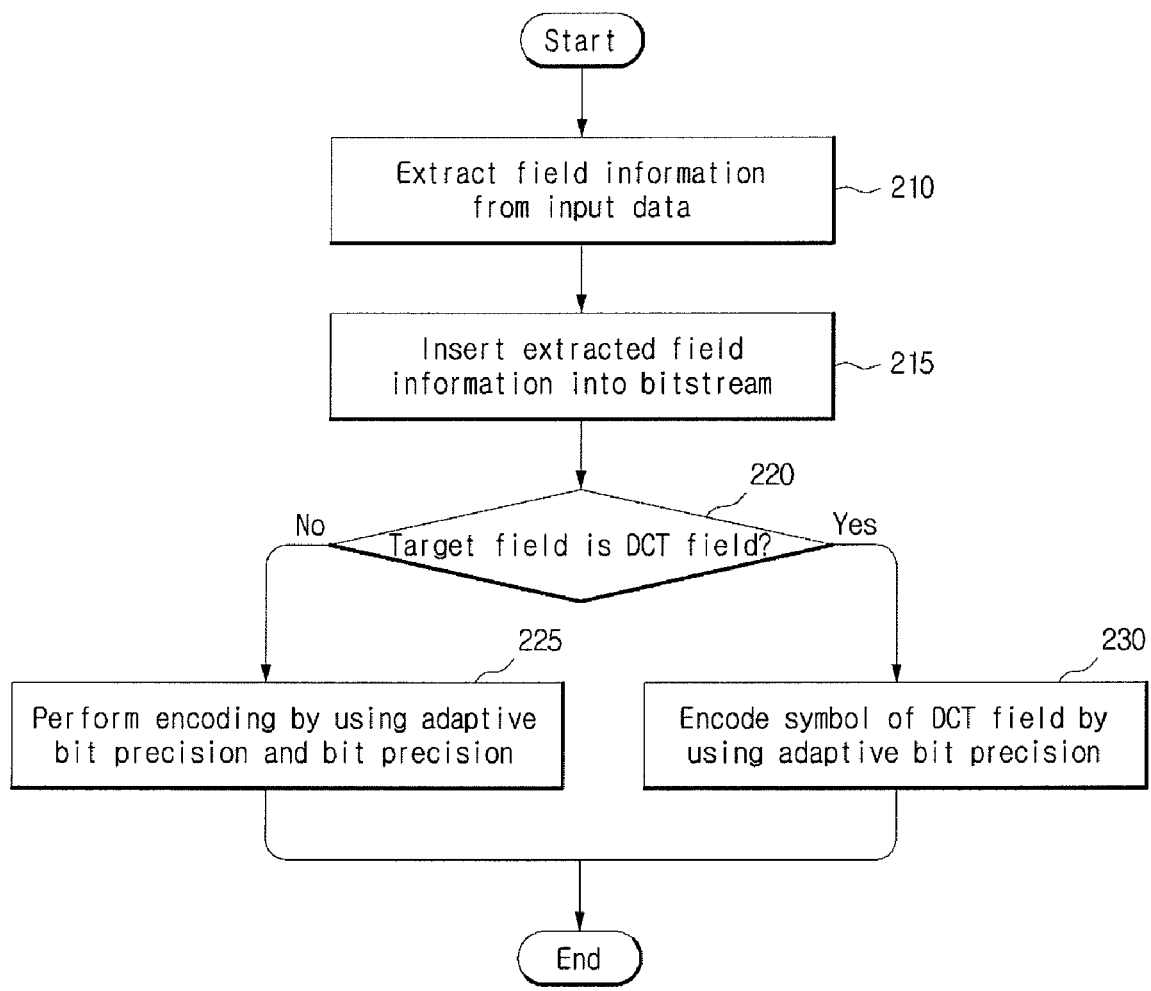
FIG. 2 is a flow chart showing how an encoding is performed per each field by using a bit precision and an adaptive bit precision in accordance with an embodiment of the present invention.

FIG. 2 is a flow chart showing how an encoding is performed per each field by using a bit precision and an adaptive bit precision in accordance with an embodiment of the present invention. Although the operations to be described below are performed by each inner element of the encoding apparatus 100, the inner elements are collectively referred to as the encoding apparatus 100 for the convenience of understanding and description.

In a step represented by 210, the encoding apparatus 100 extracts field information from input data. As described above, the field information indicates the kind (i.e. type) of fields of the input data.

In a step represented by 215, the encoding apparatus 100 inserts the extracted field information into a bitstream according to the encoding method of the present invention. For example, the encoding apparatus 100 can inserts the field information into a head of the bitstream.

In a step represented by 220, the encoding apparatus 100 checks whether a field (hereinafter, referred to as a "target field" for the convenience of understanding and description) to be currently decoded is a DCT field by using the extracted field information.

If the target field is not the DCT field, in a step represented by 225, the encoding apparatus 100 computes an adaptive bit precision and a bit precision and encodes a symbol of the target field by using the adaptive bit precision and the bit precision. This will be described below in detail with reference to FIG. 3. In this description, another field, which is not the DCT field, can be a mcbpc, cbpy or motion vector field.

However, if the target field is the DCT field, in a step represented by 230, the encoding apparatus 100 computes an adaptive bit precision corresponding to a symbol of the DCT symbol and encodes the symbol of the target symbol by using the computed adaptive bit precision. This will be described below in detail with reference to FIG. 4.

Figure 3:
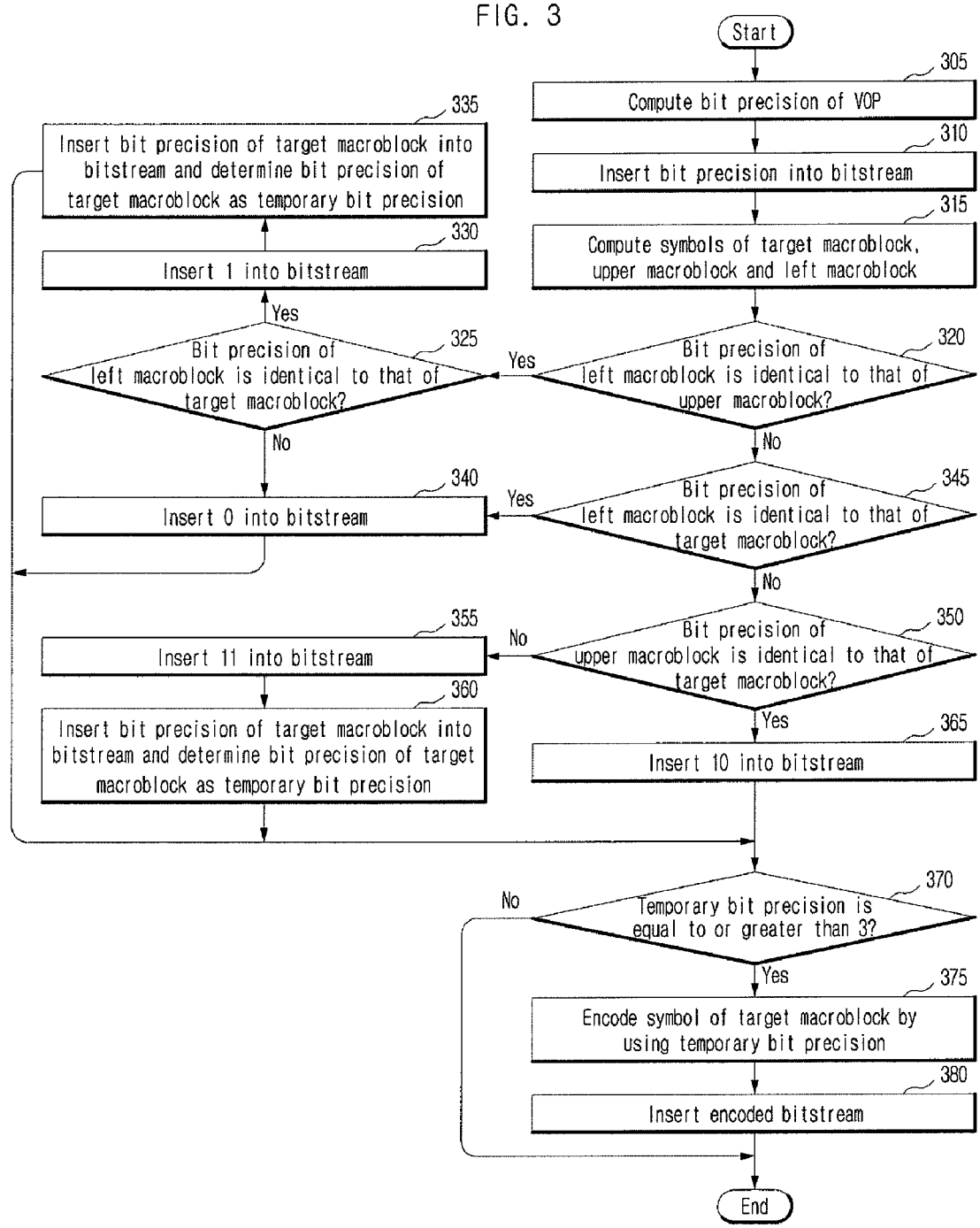
FIG. 3 is a flow chart showing how an encoding is performed by using a bit precision and an adaptive bit precision in accordance with an embodiment of the present invention.

FIG. 3 is a flow chart showing how an encoding is performed by using a bit precision and an adaptive bit precision in accordance with an embodiment of the present invention. Hereinafter, the method of encoding input data by using an adaptive bit precision and a bit precision when a target field is not a DCT field will be described in detail. Below described is a flow chart showing a detailed description related to an embodiment of the step represented by 225 of FIG. 2. Although the operations to be described below are performed by each inner element of the encoding apparatus 100, the inner elements are collectively referred to as the encoding apparatus 100 for the convenience of understanding and description. Moreover, since the method of distinguishing or extracting data in units of VOP from input data, to be described below, is evident to any person of ordinary skill in the art, the pertinent detailed description will be omitted. The encoding method to be described below can be used to encode symbols of a mcbpc, cbpy or motion vector field.

Firstly, the encoding apparatus 100 computes a bit precision of a VOP in a step represented by 305. At this time, the bit precision is computed by using an index of a Huffman table of each field. For example, the encoding apparatus 100 can compute a bit precision by using possibility information of a VLC table of the MPEG standard. Here, the Huffman table, which is used in a Huffman encoding method, lists bit strings to be encoded according to the frequency of symbols to be encoded. Since the Huffman table is evident to any person of ordinary skill in the art, the pertinent detailed description will be omitted.

In a step represented by 310, the decoding apparatus 100 determines the computed bit precision as a temporary bit precision and inserts the temporary bit precision into a bit stream. In this description, the temporary bit precision is another term which refers to an adaptive bit precision. Accordingly, the temporary bit precision must be analyzed or understood as the adaptive bit precision in the description related to the present invention.

In this description, the temporary bit precision is defined as a variable that stores a bit precision. The temporary bit precision is used for the encoding in the following operations.

In a step represented by 315, the encoding apparatus computes symbols of a target macroblock, an upper macroblock and a left macroblock, respectively.

In this description, the target macroblock refers to the macroblock that is currently being encoded. The upper macroblock refers to the next macroblock to the upper side of the target macroblock, and the lower macroblock refers to the next block to the left side of the target macroblock.

In a step represented by 320, the encoding apparatus compares bit precisions of the left macroblock and the upper macroblock and checks whether the bit precision of the left macroblock is identical to that of the upper macroblock.

In the description hereinafter, it shall be understood that the bit precision of a macroblock and the bit precision of a symbol of a macroblock have the same meaning.

If it is determined that the bit precision of the left macroblock is identical to that of the upper macroblock, in a step represented by 325, the encoding apparatus 100 checks whether a bit precision of the left macroblock is identical to that of the target macroblock.

If the bit precision of the left macroblock is identical to that of the target macroblock, in a step represented by 330, the encoding apparatus 100 inserts a first bit value (e.g. "1") into a bitstream.

In a step represented by 335, the encoding apparatus 100 determines the bit precision of the target macroblock as a temporary bit precision. In the step represented by 335, the encoding apparatus 100 insets the bit precision of the target macroblock into the bitstream.

As the result of checking it in the step represented by 325, if it is determined that the bit precision of the left macroblock is not identical to that of the upper macroblock, in a step represented by 340, the encoding apparatus 100 inserts a second bit value (e.g. "0") into the bitstream.

As the result of checking it in the step represented by 320, if it is determined that the bit precision of the left macroblock is not identical to that of the upper macroblock, in a step represented by 345, the encoding apparatus 100 checks whether the bit precision of the left macroblock is identical to that of the target macroblock.

If it is determined that the bit precision of the left macroblock is identical to that of the target macroblock, the encoding apparatus 100 performs the step represented by 340.

However, if it is determined that the bit precision of the left macroblock is not identical to that of the target macroblock, in a step represented by 350, the encoding apparatus 100 checks whether a bit precision of the upper macroblock is identical to that of the target macroblock.

If it is determined that the bit precision of the upper macroblock is not identical to that of the target macroblock, in a step represented by 355, the encoding apparatus 100 inserts a third bit value (e.g. "11") into the bitstream.

In a step represented by 360, the encoding apparatus 100 determines the bit precision of the target macroblock as the temporary bit precision. The encoding apparatus 100 also inserts the bit precision of the target macroblock into the bitstream.

However, if it is determined that the bit precision of the upper macroblock is identical to that of the target macroblock, in a step represented by 365, the encoding apparatus 100 inserts a fourth bit value (e.g. "10") into the bit stream.

In a step represented by 370, the encoding apparatus 100 checks whether a value of the temporary bit precision is equal to or larger than a threshold value (e.g. "3").

If the value of the temporary bit precision is equal to or larger than the threshold value (e.g. "3"), in a step represented by 375, the encoding apparatus 100 encodes a symbol of the target macroblock by using the temporary bit precision.

For example, the encoding apparatus 100 can consider the temporary bit precision as an adaptive bit precision and compute an adaptive bit string corresponding to the temporary bit precision in order to encode the pertinent symbol by using the adaptive bit string.

In a step represented by 380, the encoding apparatus 100 inserts the decoded bit string (i.e. the adaptive bit string) into the bitstream.

As the result of checking it in the step represented by 370, if the value of the temporary bit precision is smaller than the threshold value (e.g. "3"), the encoding apparatus 100 ends the encoding operation of the target macroblock.

Even though the method of encoding symbols of one macroblock has been described above for clear description of the present invention, the encoding apparatus 100 can repeatedly perform the steps represented by 315 through 380 until all symbols of a pertinent frame or VOP are encoded.

Hereinafter, the operation of encoding symbols of a DCT field will be described.

Figure 4:
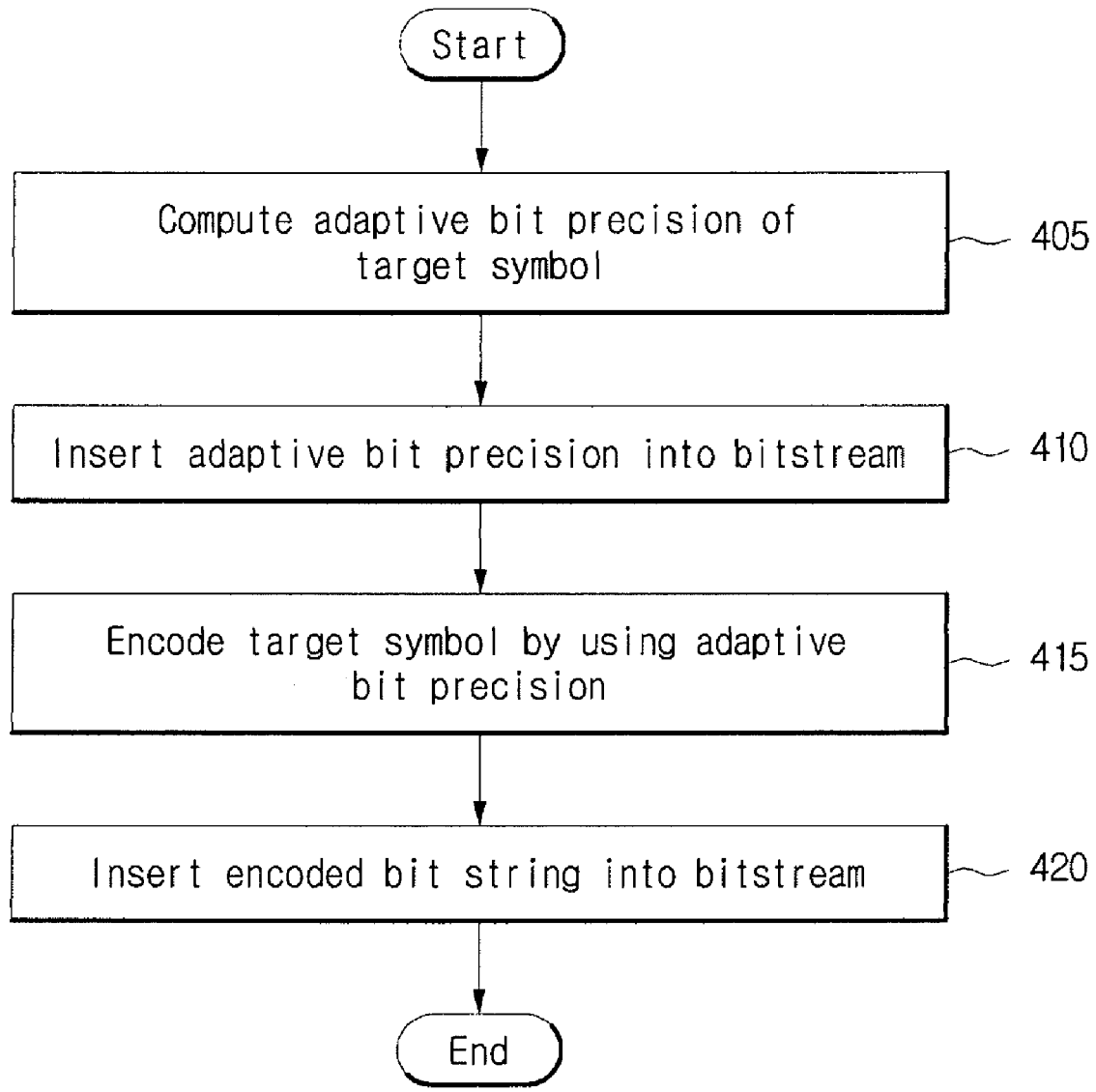
FIG. 4 is a flow chart showing an operation of encoding a symbol of a DCT field by using an adaptive bit precision in accordance with an embodiment of the present invention.

FIG. 4 is a flow chart showing an operation of encoding a symbol of a DCT field by using an adaptive bit precision in accordance with an embodiment of the present invention. Below described is a flow chart showing a detailed description related to an embodiment of the step represented by 230 of FIG. 2. Although the operations to be described below are performed by each inner element of the encoding apparatus 100, the inner elements are collectively referred to as the encoding apparatus 100 for the convenience of understanding and description.

In a step represented by 405, the encoding apparatus 100 computes an adaptive bit precision of a target symbol. Here, the target symbol refers to the symbol that is currently being encoded among the symbols of a DCT field.

In a step represented by 410, the encoding apparatus 100 inserts the adaptive bit precision into a bitstream to correspond to the target symbol.

In a step represented by 415, the encoding apparatus 100 generates an adaptive bit string by encoding the target symbol by use of the adaptive bit precision.

In a step represented by 420, the encoding apparatus 100 inserts the generated adaptive bit string (i.e. the encoded target symbol) into the bitstream.

Even though the method of encoding symbols of one macroblock has been described above for clear description of the present invention, the encoding apparatus 100 can repeatedly perform the steps represented by 410 through 420 until all symbols of a pertinent frame or VOP are encoded.

Figure 5:
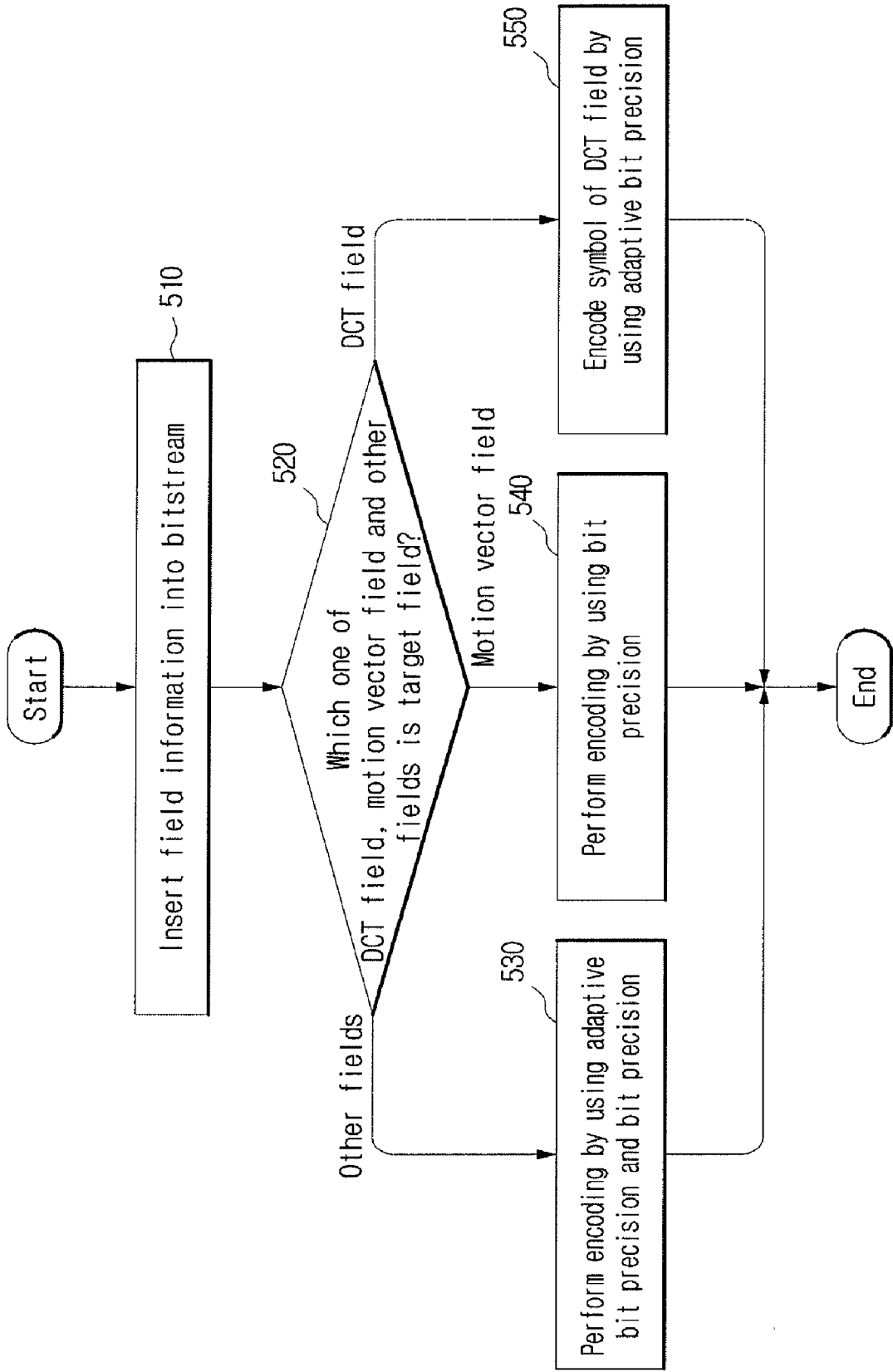
FIG. 5 is a flow chart showing how an encoding is performed per each field by using a bit precision and an adaptive bit precision in accordance with another embodiment of the present invention.

FIG. 5 is a flow chart showing how an encoding is performed per each field by using a bit precision and an adaptive bit precision in accordance with another embodiment of the present invention. Although the operations to be described below are performed by each inner element of the encoding apparatus 100, the inner elements are collectively referred to as the encoding apparatus 100 for the convenience of understanding and description.

In a step represented by 510, the encoding apparatus 100 inserts field information into a bitstream.

In particular, the encoding apparatus 100 can extract the field information form input data before inserting the field information into a header of the bitstream. Accordingly, the field information can be extracted and used in the below operation of decoding each symbol.

In a step represented by 520, the encoding apparatus 100 recognizes which one of DCT, motion vector and other fields is the field (hereinafter, referred to as a "target field" for the convenience of understanding and description) that is currently being encoded by using the extracted field information. As described above, the field information can refer to the information indicating the kind (i.e. type) of the pertinent field.

In this description, the remainders except for the motion vector field and the DCT field are referred to as other fields for the convenience of understanding and description. For example, other fields can include mcbpc and cbpy fields.

If it is determined that the target field is one of other fields, in a step represented by 530, the encoding apparatus 100 computes an adaptive bit precision and a bit precision corresponding to the target field. The encoding apparatus 100 can also encode symbols of the target field by using the computed adaptive bit precision and bit precision. Since the operation of encoding the symbols of the target field by using the adaptive bit precision and bit precision is identical to that of encoding the symbol of the target macroblock in FIG. 4, the overlapped description will be omitted.

However, if it is determined that the target field is the motion vector field, in a step represented by 540, the encoding apparatus 100 computes a bit precision of a symbol of the target field and decodes the symbol of the target field by using the computed bit precision. This is will be described below in more detail with reference to FIG. 6 through FIG. 8.

If the target field is the DCT field, in a step represented by 550, the encoding apparatus 100 computes an adaptive bit precision of the symbol of the target field. The encoding apparatus 100 also encodes the symbol of the target field by using the computed adaptive bit precision. Since this is the same as described with reference to FIG. 4, the overlapped description will be omitted.

Figure 6:
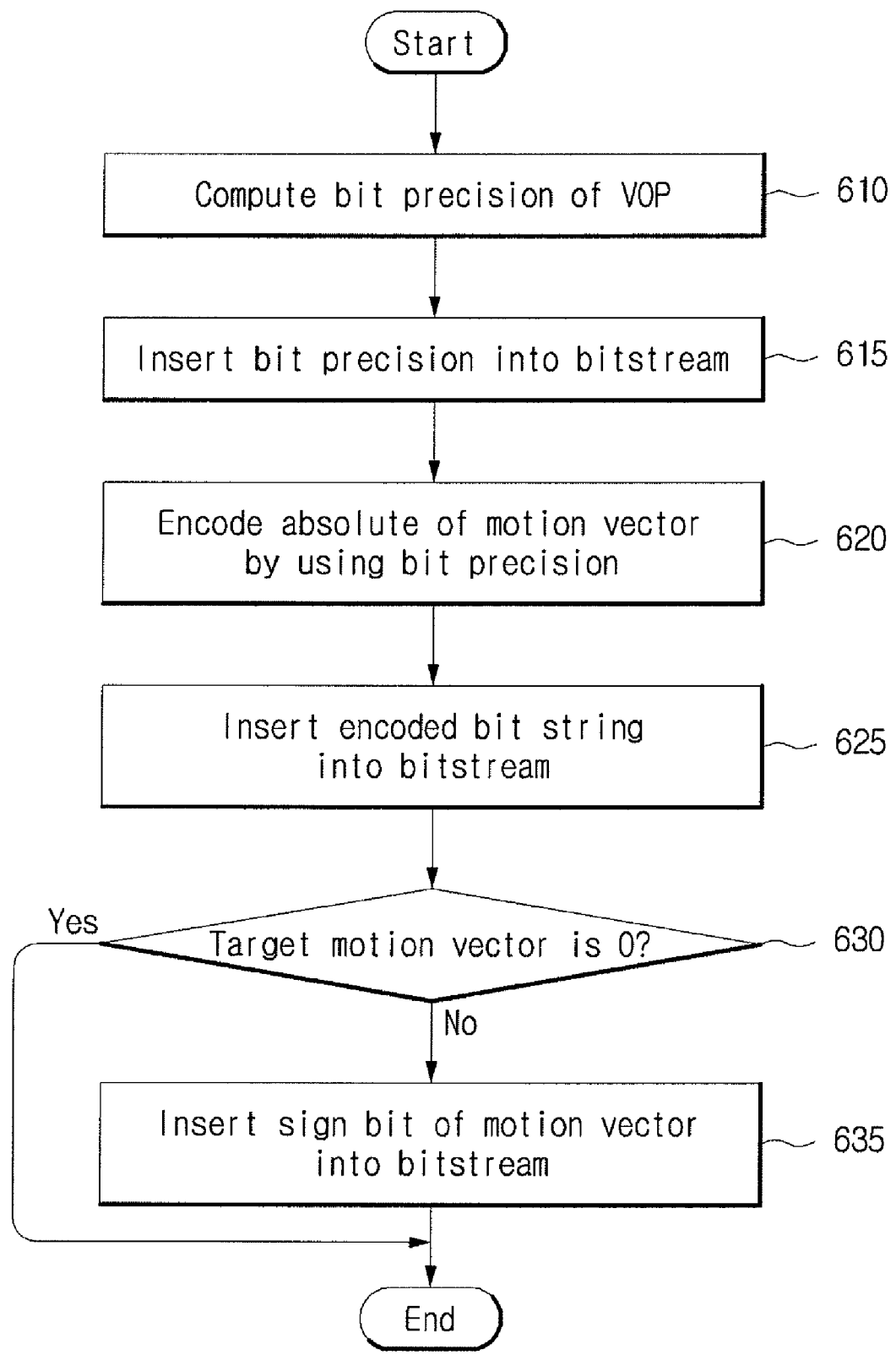
FIG. 6 is a flow chart showing an operation of encoding a field of a motion vector by using a bit precision in accordance with an embodiment of the present invention.

FIG. 6 is a flow chart showing an operation of encoding a field of a motion vector by using a bit precision in accordance with an embodiment of the present invention. This is a flow chart showing a detailed description related to an embodiment of the step represented by 540 of FIG. 5. Although the operations to be described below are performed by each inner element of the encoding apparatus 100, the inner elements are collectively referred to as the encoding apparatus 100 for the convenience of understanding and description.

In a step represented by 610, the encoding apparatus 100 computes a bit precision of a target VOP of an X-axis motion vector (hereinafter, referred to as "MV-X" for the convenience of understanding and description) field or a Y-axis axis motion vector (hereinafter, referred to as "MV-X" for the convenience of understanding and description) field. For example, the encoding apparatus 100 can compute a bit precision by using a symbol (i.e. a motion vector) that pertains to a pertinent target VOP.

In a step represented by 615, the encoding apparatus 100 inserts the computed bit precision into a bitstream.

In a step represented by 620, the encoding apparatus 100 encodes a absolute value of a motion vector (hereinafter, referred to as a "target motion vector") that is currently being encoded by using the computed bit precision.

In a step represented by 625, the encoding apparatus 100 insets the encoded absolute value into the bitstream.

In a step represented by 630, the encoding apparatus 100 checks whether the target motion vector is "0."

If the target motion vector is "0," the encoding apparatus 100 ends the encoding of the target motion vector.

However, if the target motion vector is not "0," the encoding apparatus 100 a bit value of a sign bit of the target motion vector into the bitstream.

Even though the method of encoding symbols of one macroblock has been described above for clear description of the present invention, the encoding apparatus 100 can repeatedly perform the steps represented by 610 through 635 until all symbols of a pertinent frame or VOP are encoded.

Figure 7:
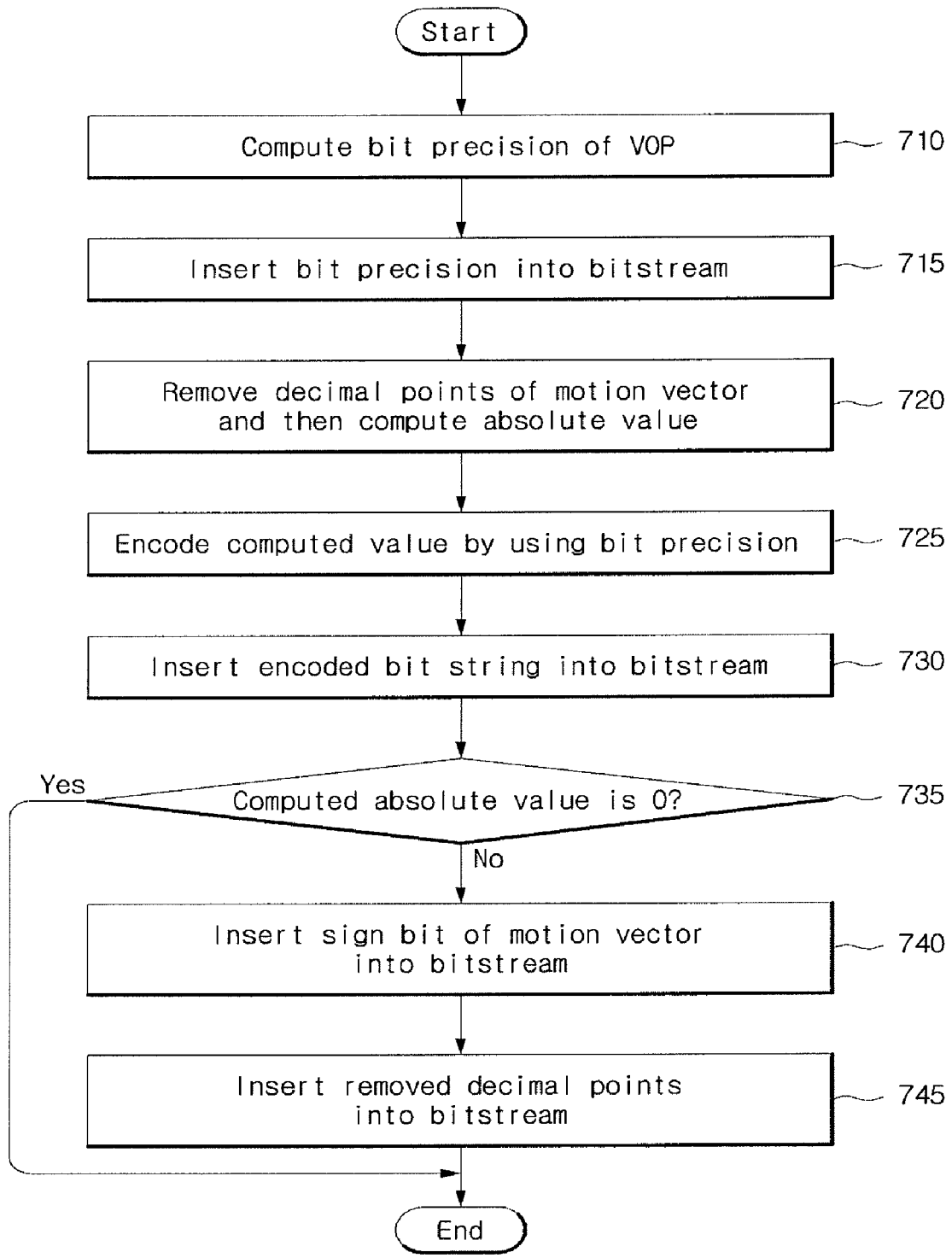
FIG. 7 is a flow chart showing an operation of encoding a field of a motion vector by using a bit precision in accordance with another embodiment of the present invention.

FIG. 7 is a flow chart showing an operation of encoding a field of a motion vector by using a bit precision in accordance with another embodiment of the present invention. This is a flow chart showing a detailed description related to another embodiment of the step represented by 540 of FIG. 5. Although the operations to be described below are performed by each inner element of the encoding apparatus 100, the inner elements are collectively referred to as the encoding apparatus 100 for the convenience of understanding and description.

In a step represented by 710, the encoding apparatus 100 computes a bit precision of a target VOP of a motion vector (e.g. MV-X or MV-Y) field. At this time, the bit precision is computed by using an index of the Huffman table of each field or a value excluding a sign (i.e. motion vector) of VOP and decimal points.

In a step represented by 715, the encoding apparatus 100 inserts the computed bit precision into a bitstream.

In a step represented by 720, the encoding apparatus 100 computes an absolute value by removing decimal points of the target symbol (i.e. the target motion vector).

In a step represented by 725, the encoding apparatus 100 encodes the computed absolute value by using the computed bit precision.

In a step represented by 730, the encoding apparatus 100 inserts the encoded absolute value into the bitstream.

In a step represented by 735, the encoding apparatus 100 checks whether the computed absolute value is 0.

If the computed absolute value is 0, since this means that there is no sign and no decimal points corresponding to the target symbol, the encoding apparatus 100 ends the encoding of the symbol.

However, if the computed absolute value is not 0, in a step represented by 740, the encoding apparatus 100 inserts the sign bit of the target symbol into the bitstream. Here, the sign bit refers to the bit value indicating a sign of the target symbol. For example, if the target symbol is positive, the sign bit has the value of 0, and if the target symbol is negative, the sign bit has the value of 1.

In a step represented by 745, the encoding apparatus 100 inserts a value of domical places removed corresponding to the target symbol (i.e. the target motion vector) into the bitstream.

Even though the method of encoding symbols of one macroblock has been described above for clear description of the present invention, the encoding apparatus 100 can repeatedly perform the steps represented by 710 through 745 until all symbols of a pertinent frame or VOP are encoded.

Figure 8:
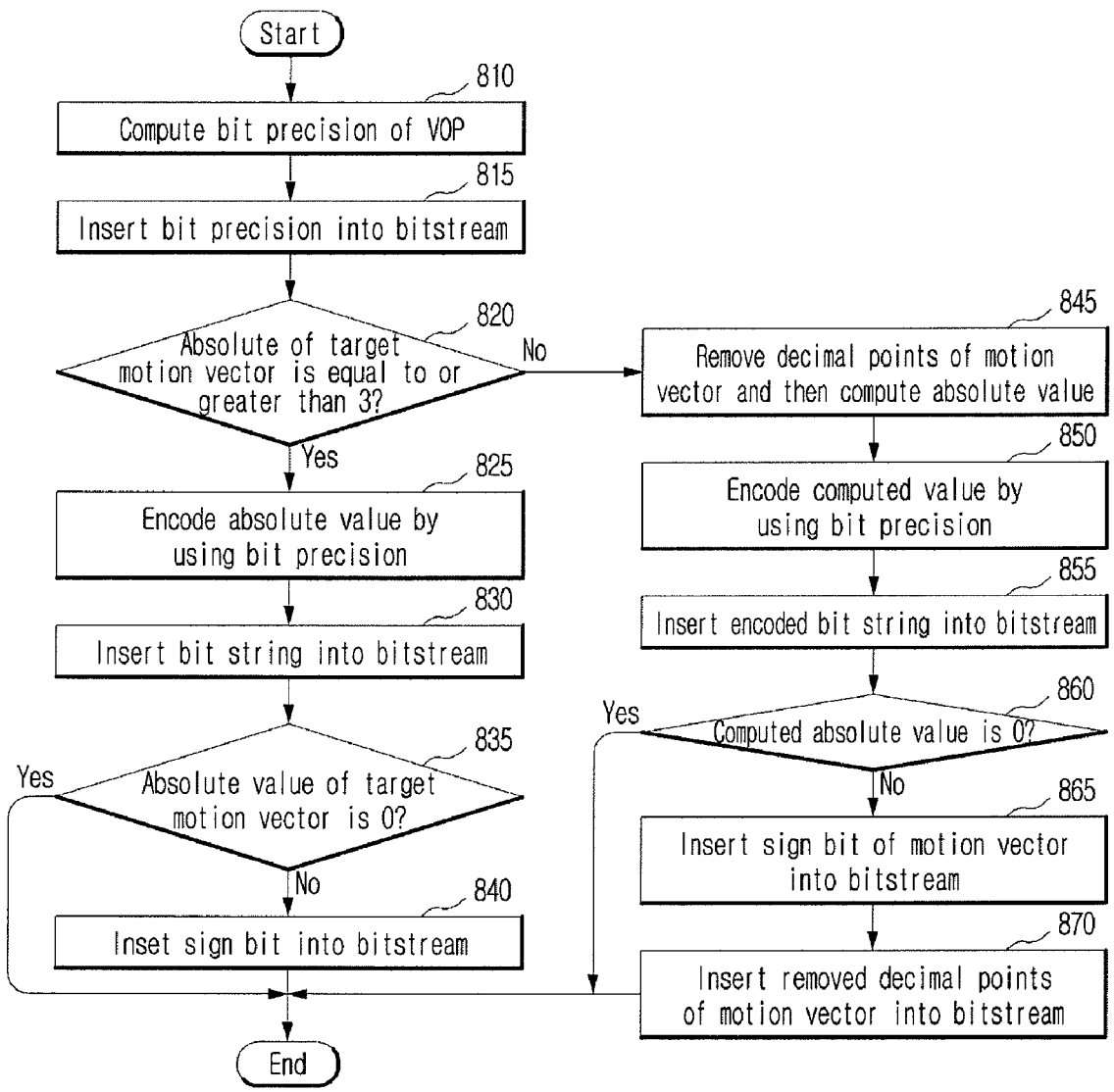
FIG. 8 is a flow chart showing an operation of encoding a field of a motion vector by using a bit precision in accordance with another embodiment of the present invention.

FIG. 8 is a flow chart showing an operation of encoding a field of a motion vector by using a bit precision in accordance with another embodiment of the present invention. This is a flow chart showing a detailed description related to another embodiment of the step represented by 540 of FIG. 5. Although the operations to be described below are performed by each inner element of the encoding apparatus 100, the inner elements are collectively referred to as the encoding apparatus 100 for the convenience of understanding and description.

In a step represented by 810, the encoding apparatus 100 computes a bit precision of a target VOP of a motion vector (e.g. MV-X or MV-Y) field. At this time, the bit precision is computed by using an index of the Huffman table of each field or a value excluding a sign (i.e. motion vector) of VOP and decimal points.

In a step represented by 815, the encoding apparatus 100 inserts the computed bit precision into a bitstream.

In a step represented by 820, the encoding apparatus 100 computes an absolute value of the target motion vector and then checks whether the absolute value of the target motion vector is equal to or smaller than a threshold value (e.g. "3").

If the target motion vector is equal to or smaller than a threshold value (e.g. "3"), in a step represented by 825, the encoding apparatus 100 encodes the absolute value of the target motion vector by using the computed bit precision.

In a step represented by 830, the encoding apparatus 100 inserts the decoded bit string (i.e. the encoded absolute value) into the bitstream.

In a step represented by 835, the encoding apparatus 100 checks whether the absolute value of the target motion vector is "0."

If the absolute value of the target motion vector is "0," the encoding apparatus 100 recognizes that the target motion vector includes no sign and no decimal points and ends the encoding of the target motion vector.

However, if the absolute value of the target motion vector is not "0," in a step represented by 840, the encoding apparatus 100 inserts a sign bit of the target motion vector into the bitstream. Here, the sign bit refers to the bit value indicating a sign of the target motion vector.

As the result of checking it in the step represented by 820, if the absolute value of the target motion vector is larger than a threshold value (e.g. "3"), in a step represented by 845, the encoding apparatus 100 removes decimal points of the target motion vector and then re-computes the absolute value without a sign and decimal points.

In a step represented by 850, the encoding apparatus 100 encodes the computed absolute value by using the bit precision.

In a step represented by 855, the encoding apparatus 100 inserts the encoded bit string (i.e. the absolute value computed by removing the decimal plates) into the bitstream.

In a step represented by 860, the encoding apparatus 100 checks whether the absolute value computed corresponding to the target motion vector is "0."

If the computed absolute value is "0," the encoding apparatus 100 recognizes that the target motion vector includes no sign and no decimal points and ends the encoding of the target motion vector If the computed absolute value is not "0," in a step represented by 865, the encoding apparatus 100 inserts the sign bit of the target motion vector into the bitstream.

In a step represented by 870, the encoding apparatus 100 inserts a value of domical places of the target motion vector into the bitstream.

Even though the method of encoding symbols of one macroblock has been described above for clear description of the present invention, the encoding apparatus 100 can repeatedly perform the steps represented by 810 through 870 until all symbols of a pertinent frame or VOP are encoded.

Figure 9:
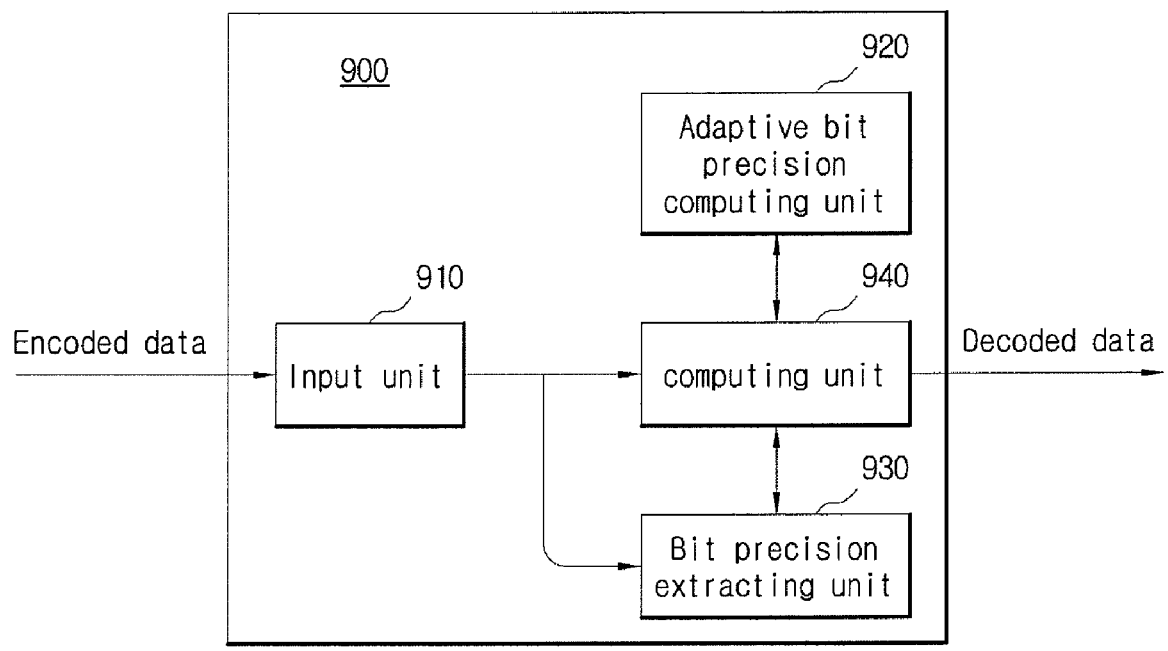
FIG. 9 is a block diagram showing a decoding apparatus using a bit precision in accordance with an embodiment of the present invention.

FIG. 9 is a block diagram showing a decoding apparatus using a bit precision in accordance with an embodiment of the present invention.

Referring to FIG. 9, the decoding apparatus 900 using a bit precision in accordance with an embodiment of the present invention includes input unit 910, an adaptive bit precision computing unit 920, a bit precision extracting unit 930 and a decoding unit 940.

The input unit 910 receives an encoded bitstream and extracts field information and data encoded per each field in a predetermined form in order to output them to the bit precision extracting unit 930 and the decoding unit 940.

The adaptive bit precision computing unit 920 computes an adaptive bit precision and an adaptive bit string corresponding to a certain field according to a request signal. Then, the adaptive bit precision computing unit 920 computes a symbol corresponding to the computed adaptive bit precision and adaptive bit string and outputs them to the decoding unit 940. Since the method of computing the adaptive bit precision and the adaptive bit string has been described above by using the following table 2, the overlapped description will be omitted. Of course, the adaptive bit precision computing unit 920 can extract an adaptive bit precision from the bitstream.

On the other hand, if the adaptive bit precision, the adaptive bit string and a symbol are pre-stored. The adaptive bit precision computing unit 920 can extract the adaptive bit precision, the adaptive bit string and the symbol and output them to the decoding unit 940. Of course, if the adaptive bit precision, the adaptive bit string and the symbol are stored in the decoding unit 940, the adaptive bit precision computing unit 920 can be omitted in the decoding apparatus 900.

The adaptive bit precision computing unit 930 extracts a bit precision from the received encoded bitstream and outputs the extracted bit precision to decoding unit 940. The adaptive bit precision computing unit 930 also computes a bit precision by using the received encoded bitstream.

For example, a bit precision of an upper macroblock and a bit precision of a left macroblock which are most adjacent to a target macroblock are computed through the received encoded bitstream. Since the method of computing a bit precision has described above by using the table 1, the pertinent description will be omitted.

The decoding unit 940 decodes an encoded bitstream inputted from the input unit 910 by using the adaptive bit precision and the bit precision. The decoding unit 940 can decode a bitstream that is differently encoded according to field information inputted from the input unit 910. This will be described below in detail with reference to the related drawings.

Figure 10:
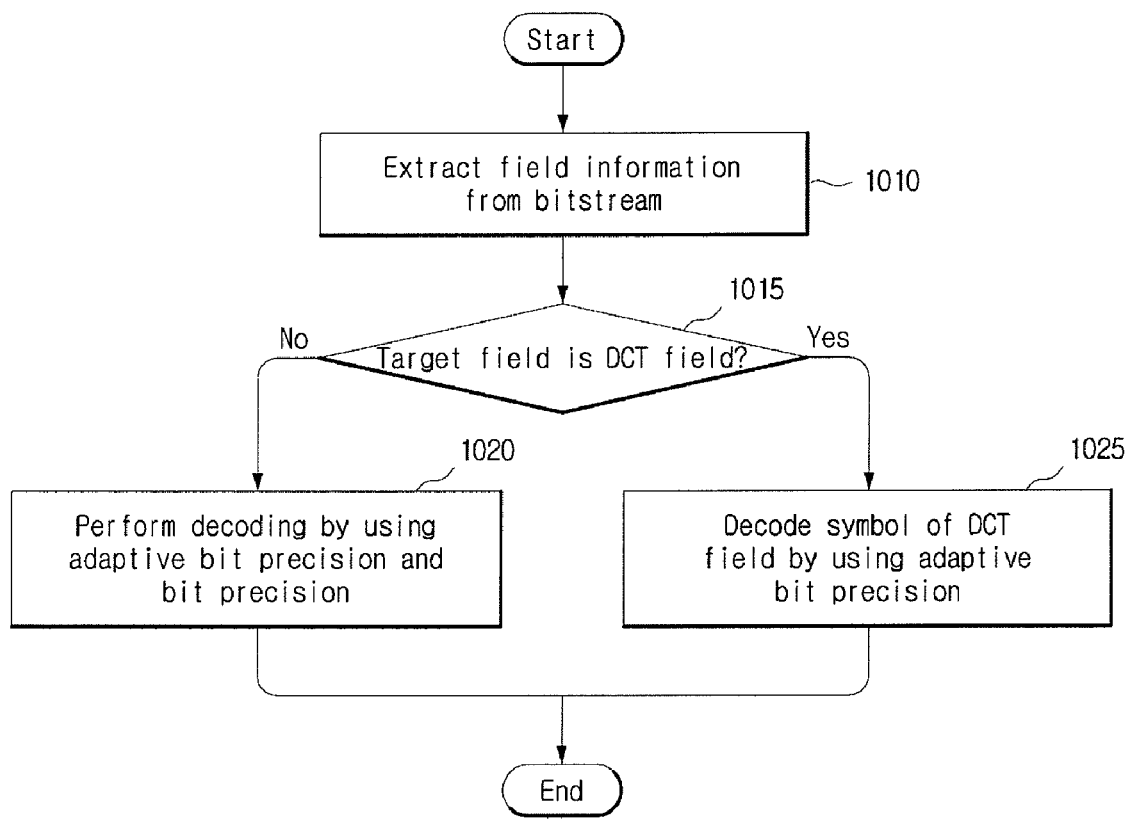
FIG. 10 is a flow chart showing how a decoding is performed per each field by using a bit precision and an adaptive bit precision in accordance with an embodiment of the present invention.

FIG. 10 is a flow chart showing how a decoding is performed per each field by using a bit precision and an adaptive bit precision in accordance with an embodiment of the present invention. Below described is the method of decoding a bitstream encoded according to the encoding method of FIG. 2. Although the operations to be described below are performed by each inner element of the decoding apparatus 900, the inner elements are collectively referred to as the decoding apparatus 900 for the convenience of understanding and description.

In a step represented by 1010, the decoding apparatus 900 extracts field information from an inputted encoded bitstream.

In a step represented by 1015, the decoding apparatus 900 checks whether a field (hereinafter, referred to as a "target field" for the convenience of understanding and description) to be decoded is a DCT field.

In this description, other fields except for the DCT field are referred to as other fields. Other fields can include a mcbpc, cbpy or motion vector field.

If the target field is not the DCT field, in a step represented by 1020, the decoding apparatus 900 performs the decoding operation corresponding to the target field by using a adaptive bit precision and a prediction bit. This will be described below in detail with reference to the related drawings.

However, if the target field is the DCT field, in a step represented by 1025, the decoding apparatus 900 decodes a bitstream encoded corresponding to the target field as a symbol by using the adaptive bit precision.

Figure 11:
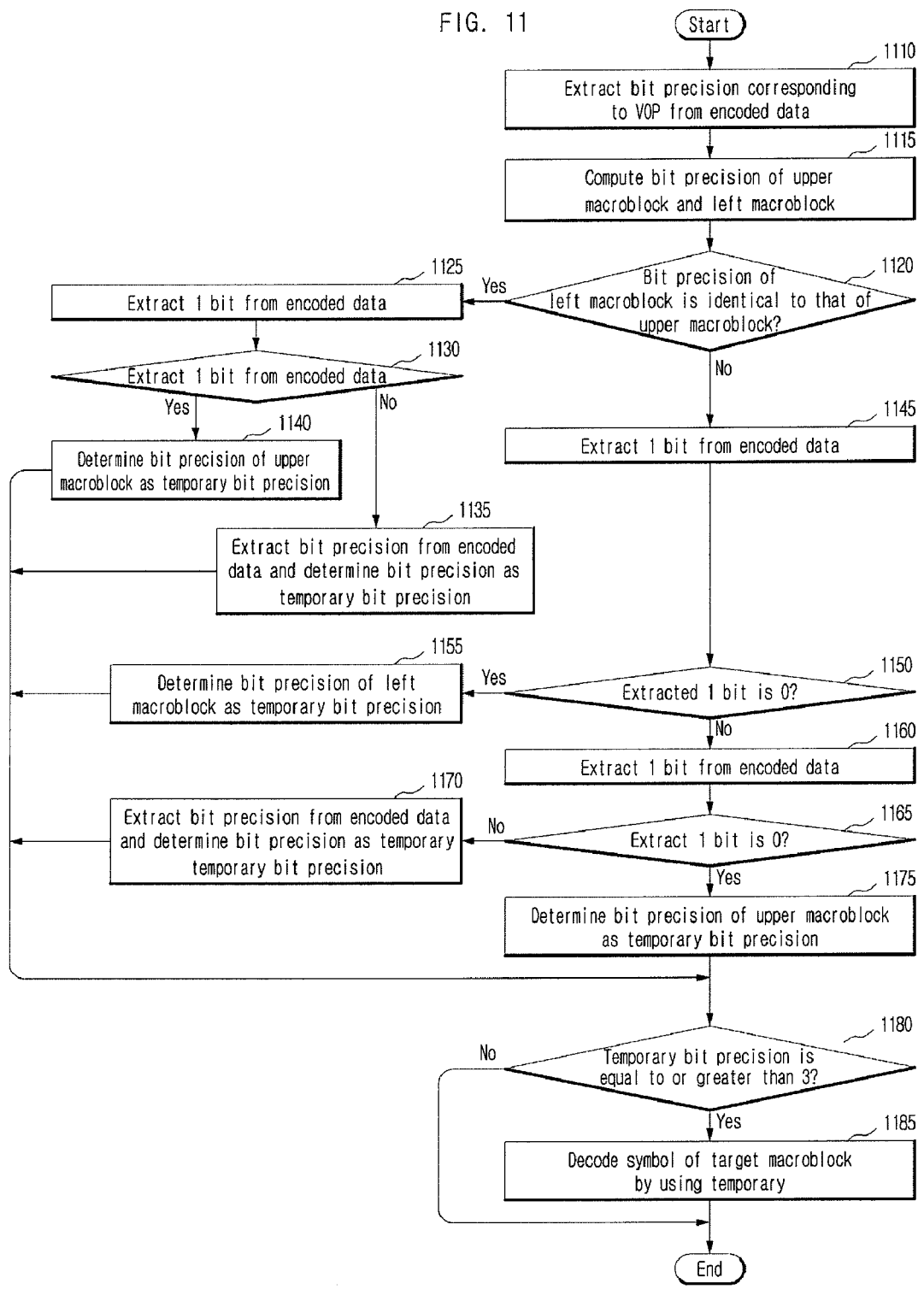
FIG. 11 is a flow chart showing how a decoding is performed by using a bit precision and an adaptive bit precision in accordance with an embodiment of the present invention.

FIG. 11 is a flow chart showing how a decoding is performed by using a bit precision and an adaptive bit precision in accordance with an embodiment of the present invention. This is a flow chart showing a detailed description related to an embodiment of the step represented by 1020 of FIG. 10. In particular, FIG. 11 is a flow chart showing the method of encoding the bitstream by the already-mentioned method in FIG. 3. Although the operations to be described below are performed by each inner element of the decoding apparatus 900, the inner elements are collectively referred to as the decoding apparatus 900 for the convenience of understanding and description.

In a step represented by 1110, the decoding apparatus 900 extracts a bit precision corresponding to a VOP from an inputted encoded bitstream.

In a step represented by 1115, the decoding apparatus 900 computes a bit precision of an upper macroblock and a bit precision of a left macroblock.

In a step represented by 1120, the decoding apparatus 900 checks whether the computed bit precision of the left macroblock is identical to the computed bit precision of the upper macroblock.

If the computed bit precision of the left macroblock is identical to the computed bit precision of the upper macroblock, in a step represented by 1125, the decoding apparatus 900 extracts 1 bit from the encoded bitstream.

In a step represented by 1130, the decoding apparatus 900 checks whether the extracted 1 bit has a fifth bit value (e.g. "1").

If the extracted 1 bit has the fifth bit value, in a step represented by 1135, the decoding apparatus 900 extracts the bit precision from the encoded bitstream and determines the computed bit precision as a temporary bit precision. As described above, the temporary bit precision is another term which refers to an adaptive bit precision. Accordingly, the temporary bit precision must be analyzed or understood as the adaptive bit precision.

If the extracted 1 bit does not have the fifth bit value, in a step represented by 1140, the decoding apparatus 900 determines the computed bit precision of the upper macroblock as the temporary bit precision As the result of checking it in the step represented by 1120, if the computed bit precision of the left macroblock is not identical to the computed bit precision of the upper macroblock, in a step represented by 1145, the decoding apparatus 900 extracts 1 bit from the encoded bitstream.

In a step represented by 1150, the decoding apparatus 900 checks whether the extracted 1 bit has a sixth bit value (e.g. "0").

If the extracted 1 bit has the sixth bit value, in a step represented by 1155, the decoding apparatus 900 determines the bit precision of the left macroblock as the temporary bit precision.

If the extracted 1 bit does not have the sixth bit value, in a step represented by 1160, the decoding apparatus 900 extracts 1 bit from the encoded bitstream.

In a step represented by 1165, the decoding apparatus 900 checks whether the extracted 1 bit has a seventh bit value (e.g. "0").

If the extracted 1 bit does not have the seventh bit value, in a step represented by 1170, the decoding apparatus 900 extracts a bit precision from the encoded bitstream and determines the extracted bit precision as the temporary bit precision.

If the extracted 1 bit has the seventh bit value, in a step represented by 1175, the decoding apparatus 900 determines the bit precision of the upper macroblock as the temporary bit precision.

In a step represented by 1010, the decoding apparatus 900 checks whether a value of the temporary bit precision is equal to or larger than a threshold value (e.g. "3").

If the value of the temporary bit precision is equal to or larger than the threshold value, in a step represented by 1185, the decoding apparatus 900 decodes a symbol of the target macroblock by using the temporary bit precision.

For example, the decoding apparatus 900 can compute an adaptive bit string corresponding to the same adaptive bit precision as the temporary bit precision. The decoding apparatus 900 can also decode the pertinent bit string as the symbol corresponding to the computed adaptive bit string.

However, if the value of the temporary bit precision is smaller than the threshold value, the decoding apparatus 900 ends the decoding operation of the pertinent macroblock.

Even though the method of decoding symbols of one macroblock has been described above for clear description of the present invention, the decoding apparatus 900 can repeatedly perform the steps represented by 1110 through 1180 until all symbols of a pertinent frame or VOP are decoded. The decoding operation in accordance with an embodiment of the present invention is to decode a bitstream, a mcbpc, cbpy, MV-x, or MV-y field being encoded in the adequate form for the decoding as the bitstream. In accordance with an embodiment of the present invention, the symbol of the DCT field can improve its compression efficiency through an additional encoding operation. Accordingly, it is also required to decode the symbol of the DCT field. Below described is the encoding operation the symbol of the DCT field.

Figure 12:
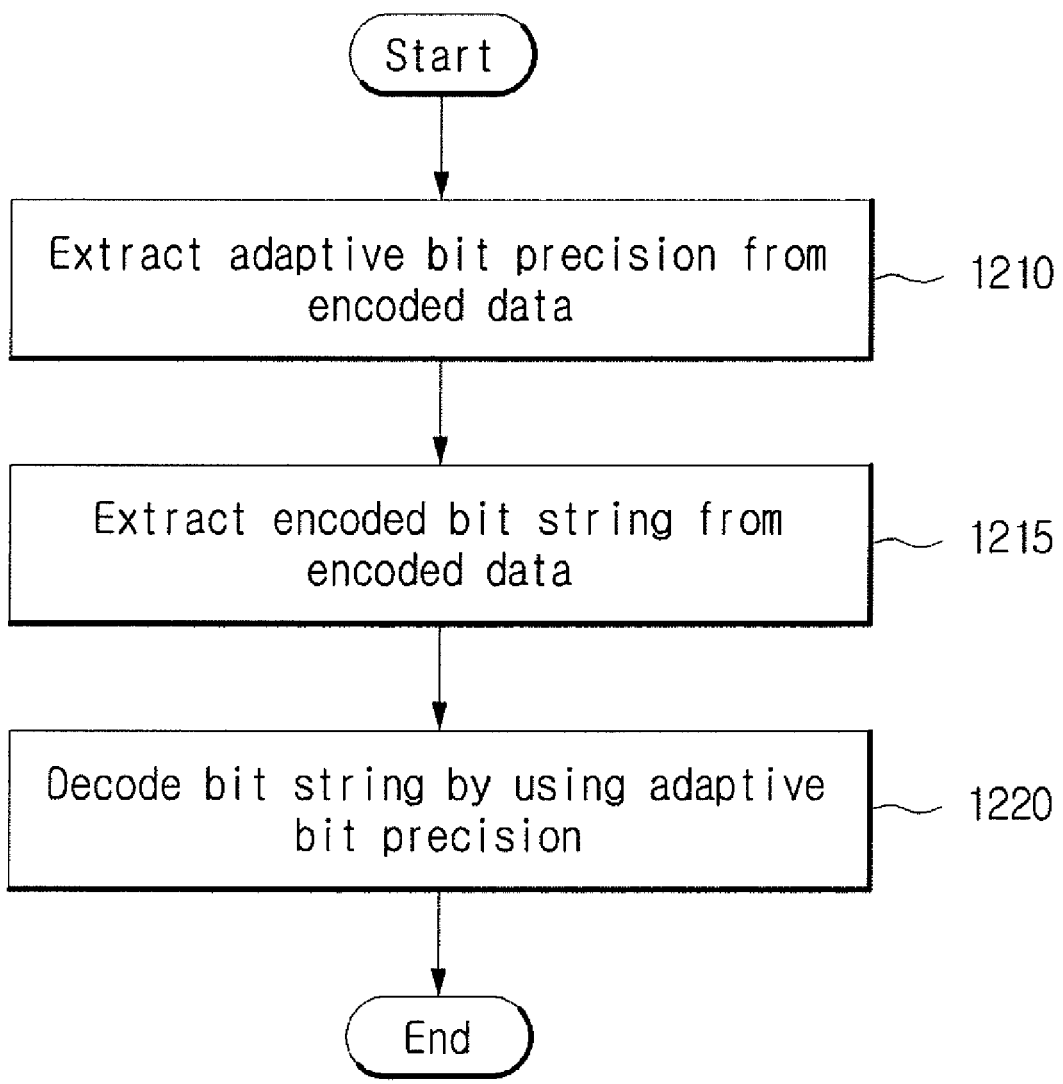
FIG. 12 is a flow chart showing an operation of decoding a symbol of a DCT field by using an adaptive bit precision in accordance with an embodiment of the present invention.

FIG. 12 is a flow chart showing an operation of decoding a symbol of a DCT field by using an adaptive bit precision in accordance with an embodiment of the present invention. This is a flow chart showing a detailed description related to an embodiment of the step represented by 1025 of FIG. 10. In particular, FIG. 12 is a flow chart showing the method of encoding the bitstream by the already-mentioned method in FIG. 4. Although the operations to be described below are performed by each inner element of the decoding apparatus 900, the inner elements are collectively referred to as the decoding apparatus 900 for the convenience of understanding and description.

In a step represented by 1210, the decoding apparatus 900 extracts an adaptive bit precision from an inputted encoded bitstream.

In a step represented by 1215, the decoding apparatus 900 extracts an encoded bit string (i.e. adaptive bit string) from the encoded bitstream.

In a step represented by 1220, the decoding apparatus 900 decodes the adaptive bit string by using the adaptive bit precision.

Even though the method of encoding symbols of one macroblock has been described above for clear description of the present invention, the decoding apparatus 900 can repeatedly perform the steps represented by 1210 through 1220 until all symbols of a pertinent frame or VOP are decoded.

Figure 13:
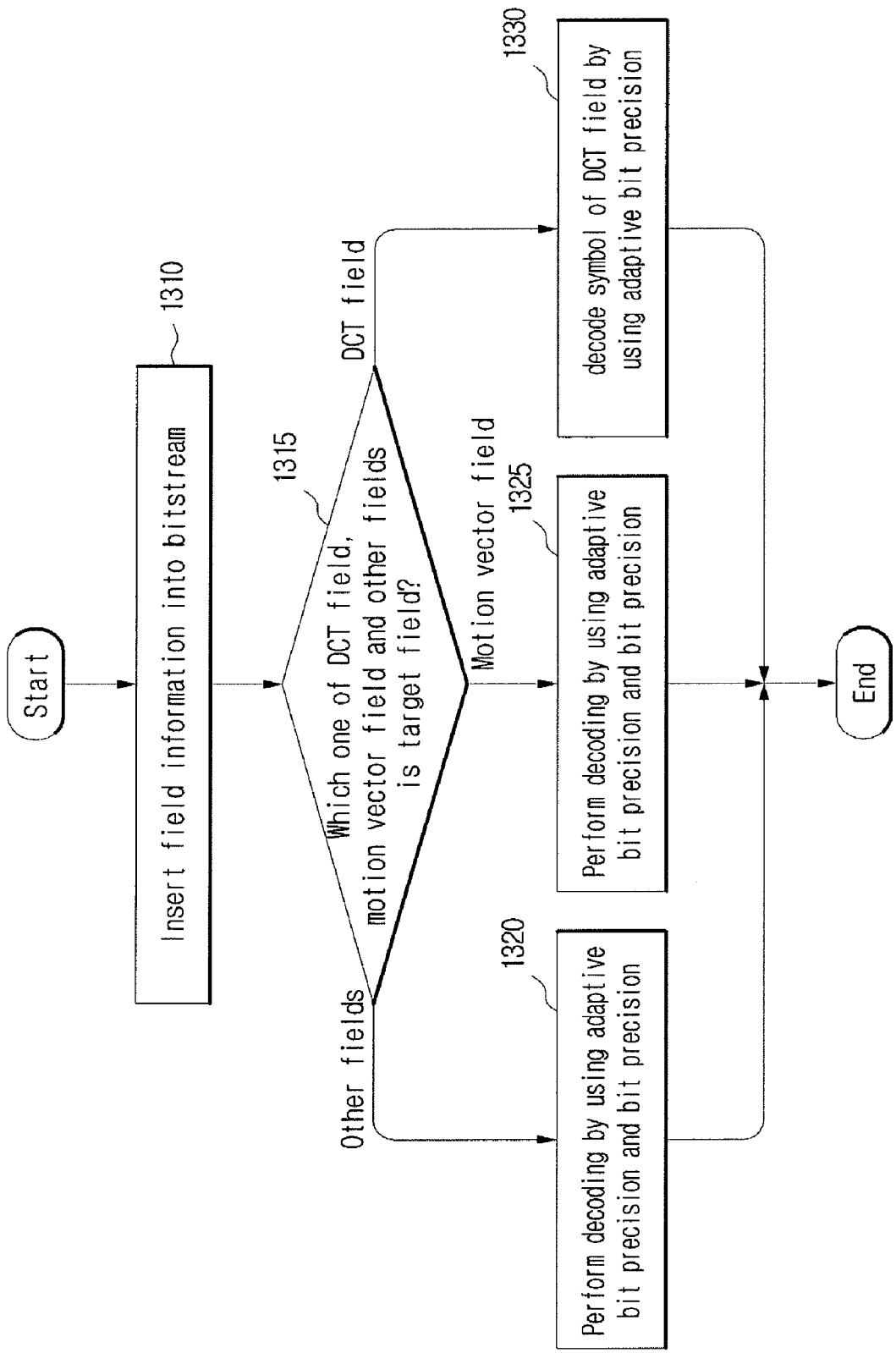
FIG. 13 is a flow chart showing how a decoding is performed per each field by using a bit precision and an adaptive bit precision in accordance with another embodiment of the present invention.

FIG. 13 is a flow chart showing how a decoding is performed per each field by using a bit precision and an adaptive bit precision in accordance with another embodiment of the present invention. Although the operations to be described below are performed by each inner element of the decoding apparatus 900, the inner elements are collectively referred to as the decoding apparatus 900 for the convenience of understanding and description.

In a step represented by 1310, the decoding apparatus 900 extracts field information from an inputted encoded bitstream. As described above, the field information indicates the kind (i.e. type) of fields of the input data.

In a step represented by 1315, the decoding apparatus 900 recognizes which one of DCT, motion vector and other fields is the field (hereinafter, referred to as a "target field" for the convenience of understanding and description) that is currently being decoded by using the extracted field information.

Other fields include the remainders except for the motion vector field and the DCT field. For example, other fields can include mcbpc and cbpy fields.

If the target field is one of other fields, in a step represented by 1320, the decoding apparatus 900 extracts an adaptive bit precision and a bit precision from the encoded bitstream. Then, the decoding apparatus 900 extracts and decodes an encoded string corresponding to the target field by using the pertinent adaptive bit precision and bit precision. Since this decoding operation is the same as described above with reference to FIG. 11, the overlapped description will be omitted.

However, if the target field is the motion vector field, in a step represented by 1325, the decoding apparatus 900 extracts a bit precision corresponding to the target field and decodes a bit string corresponding to the target field by using the extracted bit precision.

If the target field is the DCT field, in a step represented by 1330, the decoding apparatus 900 extracts an adaptive bit precision corresponding to the target field and decodes an encoded bit string corresponding to the target field by using the extracted adaptive bit precision. Since the operation of decoding encoded data as a symbol of the DCT field by using the adaptive bit precision is the same as the decoding operation described with reference to FIG. 12, the pertinent detailed description will be omitted.

Figure 14:
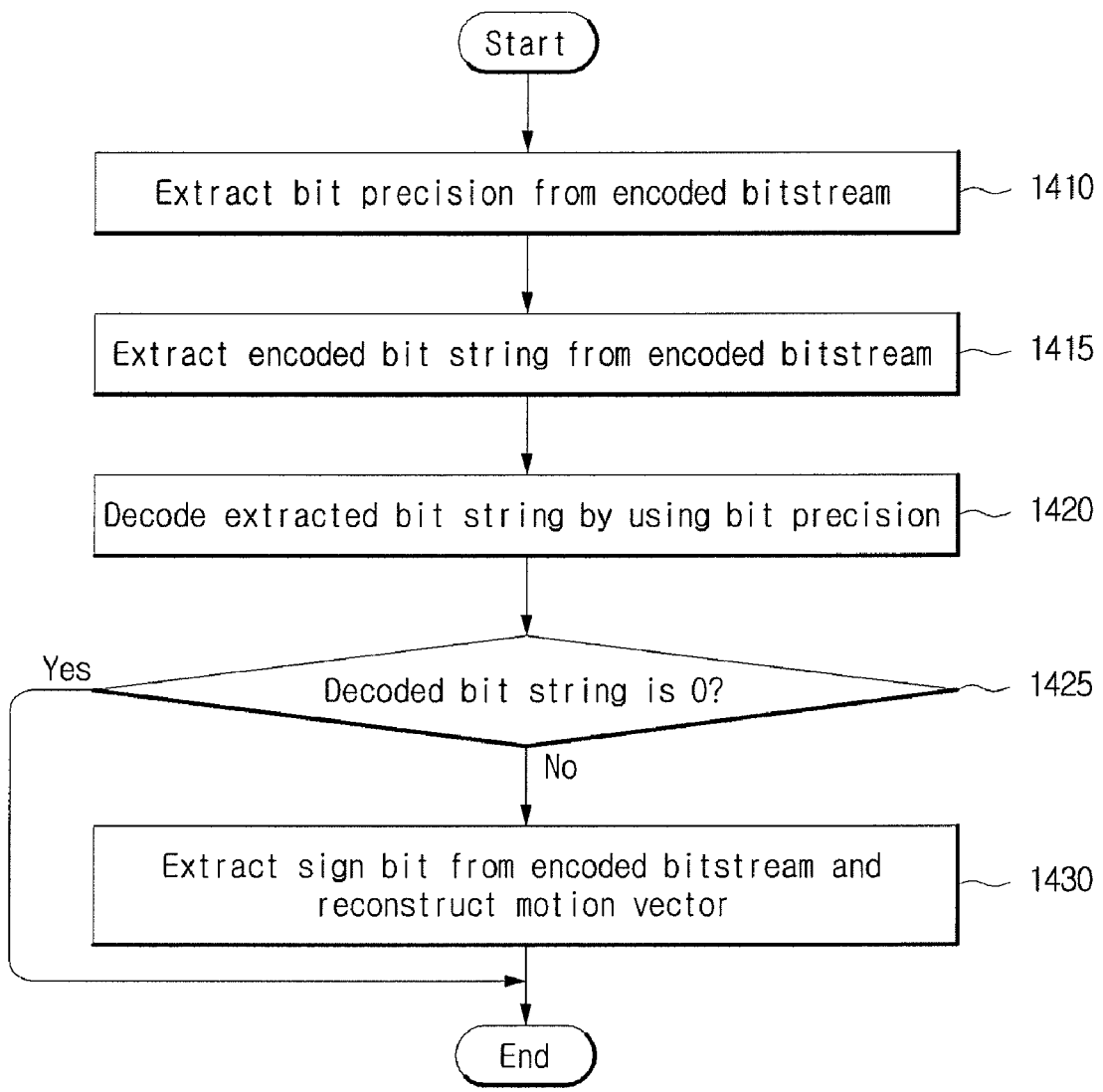
FIG. 14 is a flow chart showing an operation of decoding encoded data as a symbol of a motion vector field by using a bit precision in accordance with an embodiment of the present invention.

FIG. 14 is a flow chart showing an operation of decoding encoded data as a symbol of a motion vector field by using a bit precision in accordance with an embodiment of the present invention. This is a flow chart showing a detailed description related to an embodiment of the step represented by 1325 of FIG. 13. In particular, FIG. 14 is a flow chart showing the method of encoding the bitstream by the already-mentioned method in FIG. 6. Although the operations to be described below are performed by each inner element of the decoding apparatus 900, the inner elements are collectively referred to as the decoding apparatus 900 for the convenience of understanding and description.

In a step represented by 1410, the decoding apparatus 900 extracts a bit precision from an inputted encoded bitstream.

In a step represented by 1415, the decoding apparatus 900 extracts an encoded bit string corresponding to the extracted bit precision from the encoded bitstream.

In a step represented by 1420, the decoding apparatus 900 decodes the extracted bit string by using the extracted bit precision. Here, the decoded bit string can be a symbol (i.e. an absolute value of a motion vector).

In a step represented by 1425, the decoding apparatus 900 checks whether the decoded bit string is "0."

If the decoded bit string is "0," the decoding apparatus 900 ends the decoding operation of the pertinent bit string.

However, if the decoded bit string is not "0," in a step represented by 1430, the decoding apparatus 900 extracts a sign bit from the encoded bitstream and decodes a final symbol (i.e. a motion vector) by attaching the sign bit to the decoded string.

Even though the method of encoding symbols of one macroblock has been described above for clear description of the present invention, the decoding apparatus 900 can repeatedly perform the steps represented by 1410 through 1430 until all symbols of a pertinent frame or VOP are decoded.

FIG. 15 is a flow chart showing an operation of decoding an encoded bitstream by using bit precision in accordance with another embodiment of the present invention. This is a flow chart showing a detailed description related to another embodiment of the step represented by 1325 of FIG. 13. In particular, FIG. 15 is a flow chart showing the method of encoding the bitstream by the already-mentioned method in FIG. 7. Although the operations to be described below are performed by each inner element of the decoding apparatus 900, the inner elements are collectively referred to as the decoding apparatus 900 for the convenience of understanding and description. Hereinafter, it is assumed that symbols included in one macroblock are decoded.

In a step represented by 1510, the decoding apparatus 900 extracts a bit precision from an encoded bitstream.

In a step represented by 1515, the decoding apparatus 900 extracts an encoded bit string from the encoded bitstream.

In a step represented by 1520, the decoding apparatus 900 decodes the bit string extracted by using the extracted bit precision. Here, the decoded bit string can refer to an absolute value of the motion vector removed with decimal points.

In a step represented by 1525, the decoding apparatus 900 checks whether the decoded bit string is "0"

If the decoded bit string is "0," the decoding apparatus 900 ends the decoding operation by determining the decoded bit string as a symbol (i.e. motion vector). For example, if the decoded bit string is "0," the decoding apparatus 900 can recognize that the motion vector does not include a sign and the decimal points and end the decoding operation by outputting the decoded bit string as the symbol (i.e. motion vector).

However, if the decoded bit string is not "0," in a step represented by 1530, the decoding apparatus 900 extracts a sign bit from the encoded bitstream.

In a step represented by 1535, the decoding apparatus 900 extracts a bit string below the decimal points from the encoded bit string.

In a step represented by 1540, the decoding apparatus 900 reconstructs the symbol (i.e. motion vector) by adding the bit string below the decimal points to the decoded bit string and adding a sign corresponding to the sign bit.

Even though the method of encoding symbols of one macroblock has been described above for clear description of the present invention, the decoding apparatus 900 can repeatedly perform the steps represented by 1510 through 1540 until all symbols of a pertinent frame or VOP are decoded.

FIG. 16 is a flow chart showing an operation of decoding an encoded bitstream by using bit precision in accordance with another embodiment of the present invention. This is a flow chart showing a detailed description related to another embodiment of the step represented by 1325 of FIG. 13. In particular, FIG. 16 is a flow chart showing the method of encoding the bitstream by the already-mentioned method in FIG. 8. Although the operations to be described below are performed by each inner element of the decoding apparatus 900, the inner elements are collectively referred to as the decoding apparatus 900 for the convenience of understanding and description.

In a step represented by 1610, the decoding apparatus 900 extracts a bit precision from an encoded bitstream.

In a step represented by 1615, the decoding apparatus 900 extracts an encoded bit string from the encoded bitstream.

In a step represented by 1620, the decoding apparatus 900 decodes the bit string extracted by using the extracted bit precision. Here, the decoded bit string can refer to an absolute value of the motion vector removed with decimal points.

In a step represented by 1625, the decoding apparatus 900 checks whether the value of the decoded bit string is equal to or smaller than "3."

If the value of the decoded bit string is equal to or smaller than "3," in a step represented by 1630, the decoding apparatus 900 checks whether the decoded bit string has the value of "0."

If the decoded bit string has the value of "0," the decoding apparatus 900 determines that the decoded bit string is the motion vector including no sign and no decimal point and ends the decoding operation of the decoded bit string by outputting the decoded bit string as the symbol (i.e. motion vector).

However, if the decoded bit string does not have the value of "0," in a step represented by 1635, the decoding apparatus 900 extracts a sign bit from the encoded bitstream. Then, the decoding apparatus 900 reconstructs the symbol (i.e. motion vector) by adding the extracted sign bit to the decoded bit string.

As the result of checking it in the step represented by 1625, if the value of the decoded bit string is larger than "3," in a step represented by 1640, the decoding apparatus 900 checks whether the decoded bit string has the value of "0."

If the decoded bit string has the value of "0, the decoding apparatus 900 reconstructs the decoded bit string as the symbol (i.e. motion vector) and ends the decoding operation of the decoded bit string.

However, if the decoded bit string does not have the value of "0," in a step represented by 1645, the decoding apparatus 900 extracts a sign bit from the encoded bitstream.

In a step represented by 1650, the decoding apparatus 900 extracts a bit string below the decimal points from the encoded bit string.

In a step represented by 1655, the decoding apparatus 900 reconstructs the symbol (i.e. motion vector) by adding the bit string below the decimal points to the decoded bit string and adding a sign corresponding to the extracted sign bit.

Even though the method of encoding symbols of one macroblock has been described above for clear description of the present invention, the decoding apparatus 900 can repeatedly perform the steps represented by 1610 through 1655 until all symbols of a pertinent frame or VOP are decoded.

Hitherto, although some embodiments of the present invention have been shown and described for the above-described objects, it will be appreciated by any person of ordinary skill in the art that a large number of modifications, permutations and additions are possible within the principles and spirit of the invention, the scope of which shall be defined by the appended claims and their equivalents.

INDUSTRIAL APPLICABILITY

The present invention can be applied to a video codec.

The invention claimed is:

1. An encoding apparatus, comprising:
an adaptive bit precision computing unit, configured to compute an adaptive bit precision and an adaptive bit string per symbol;
a bit precision computing unit, configured to compute a bit precision per predetermined field; and
an encoding unit, configured to encode an input datum by using any one of the adaptive bit precision and the bit precision according to a type of a target field.

2. The apparatus of claim 1, wherein the adaptive bit string refers to a bit string at which the input datum is encoded by using the adaptive bit precision,
the adaptive bit precision refers to a bit indicating a length of a unit bit string having optimized encoding efficiency corresponding to the symbol among lengths of the unit bit string and
the bit precision refers to a bit indicating a length of a unit bit string for encoding the input datum.

3. The apparatus of claim 1, wherein, if the target field encodes the input datum by using the adaptive bit precision, the encoding unit inserts a bit, indicating whether adaptive bit precisions of a target macroblock, an upper macroblock and a left macroblock are identical to one another, into a bitstream and inserts the adaptive bit string corresponding to the adaptive bit precision into the bitstream.

4. An encoding method, comprising:
computing an adaptive bit precision and an adaptive bit string per symbol;
computing a bit precision per predetermined field; and
encoding an input datum by using any one of the adaptive bit precision and the bit precision according to a type of a target field.

5. The method of claim 4, wherein the adaptive bit string refers to a bit string as which the input datum is encoded by using the adaptive bit precision,
the adaptive bit precision refers to a bit indicating a length of a unit bit string having optimized encoding efficiency corresponding to the symbol among lengths of the unit bit string and
the bit precision refers to a bit indicating a length of a unit bit string for encoding the input datum.

6. The method of claim 4, wherein, if the input datum is encoded by using the adaptive bit precision, the encoding of the input datum comprises:
inserting a bit, indicating whether adaptive bit precisions of a target macroblock, an upper macroblock and a left macroblock are identical to one another, into a bitstream;
inserting the adaptive bit precision of the target macroblock into the bitstream according to whether the adaptive bit precisions of the target macroblock, the upper macroblock and the left macroblock are identical to one another; and
inserting the adaptive bit string corresponding to the adaptive bit precision into the bitstream.

7. A decoding apparatus, comprising:
an adaptive bit precision computing unit, configured to compute an adaptive bit precision and an adaptive bit string per symbol;
a bit precision extracting unit, configured to extract a bit precision from an inputted bitstream per predetermined field; and
an decoding unit, configured to decode the bitstream by using any one of the adaptive bit precision and the bit precision according to a type of a target field.

8. The apparatus of claim 7, wherein the adaptive bit string refers to a bit string as which the input datum is encoded by using the adaptive bit precision,
the adaptive bit precision refers to a bit indicating a length of a unit bit string having optimized encoding efficiency corresponding to the symbol among lengths of the unit bit string and
the bit precision refers to a bit indicating a length of a unit bit string for encoding the input datum.

9. The apparatus of claim 7, wherein, if the target field is decoded by using the adaptive bit precision, the decoding unit extracts a bit, indicating whether adaptive bit precisions of a target macroblock, an upper macroblock and a left macroblock are identical to one another, from the bitstream, and
extracts an adaptive bit precision value corresponding to the target field from the bitstream according to the bit indicating whether the adaptive bit precisions of the target macroblock, the upper macroblock and the left macroblock are identical to one another and decodes the target field by using the adaptive bit precision.

10. The apparatus of claim 7, wherein the decoding unit extracts the adaptive bit string by using the adaptive bit precision and restores the target field by decoding the adaptive bit string.

11. A decoding method, comprising:
computing an adaptive bit precision and an adaptive bit string per symbol;
extracting a bit precision from a bitstream per predetermined field; and
decoding the bitstream by using any one of the adaptive bit precision and the bit precision according to a type of a target field.

12. The method of claim 11, wherein the adaptive bit string refers to a bit string as which an input datum is encoded by using the adaptive bit precision,
the adaptive bit precision refers to a bit indicating a length of a unit bit string having optimized encoding efficiency corresponding to the symbol among lengths of the unit bit string and
the bit precision refers to a bit indicating a length of a unit bit string for encoding the input datum.

13. The method of claim 11, wherein, if the target field is decoded by using the adaptive bit precision, the decoding of the bitstream comprises:
extracting a bit, indicating whether adaptive bit precisions of a target macroblock, an upper macroblock and a left macroblock are identical to one another, from the bitstream;
extracting an adaptive bit precision value corresponding to the target field from the bitstream according to the bit indicating whether the adaptive bit precisions of the target macroblock, the upper macroblock and the left macroblock are identical to one another; and
decoding the target field by using the adaptive bit precision.

14. The method of claim 11, wherein the decoding of the bitstream is performed by extracting the adaptive bit string from the bitstream by using the adaptive bit precision and restoring the target field by decoding the adaptive bit string.

* * * * *